US011157616B2

(12) United States Patent
Nalluri et al.

(10) Patent No.: US 11,157,616 B2
(45) Date of Patent: Oct. 26, 2021

(54) MOBILE APPLICATION MANAGEMENT

(71) Applicant: McAfee, LLC, San Jose, CA (US)

(72) Inventors: Srikanth Nalluri, Karnataka (IN);
Dattatraya Kulkarni, Bangalore (IN);
Raja Sinha, Bangalore (IN);
Venkatasubrahmanyam Krishnapur,
Bangalore (IN); **Kaushal Kumar
Dhruw, Bangalore (IN); Kamlesh
Halder**, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 16/138,904

(22) Filed: Sep. 21, 2018

(65) Prior Publication Data

US 2019/0026464 A1    Jan. 24, 2019

Related U.S. Application Data

(63) Continuation of application No. 15/652,623, filed on Jul. 18, 2017, now Pat. No. 10,114,950, which is a
(Continued)

(30) Foreign Application Priority Data

Oct. 19, 2012    (IN) .......................... 1215/KOL/2012

(51) Int. Cl.
*G06F 21/56*    (2013.01)
*G06F 8/41*    (2018.01)
(Continued)

(52) U.S. Cl.
CPC ............ *G06F 21/563* (2013.01); *G06F 8/436*
(2013.01); *G06F 21/51* (2013.01); ***G06F
21/552*** (2013.01);
(Continued)

(58) Field of Classification Search
CPC .. G06F 21/563; G06F 21/552; G06F 21/6218;
G06F 21/51; G06F 8/436;
(Continued)

(56) References Cited

U.S. PATENT DOCUMENTS 5,987,610  A    11/1999  Franczek et al.
6,073,142  A     6/2000  Geiger et al.
(Continued)

FOREIGN PATENT DOCUMENTS

CN    1825278 A    8/2006
CN    1918528 A    2/2007
(Continued)

OTHER PUBLICATIONS

"Malware Classification based on SVM and Labeling by API's Tendency", Usui, et al, CSS2011, Computer Security Symposium 2011 held with Anti Malware Engineering Workshop 2011 Information Processing Society of Japan Symposium Series Vo. 2011 No. 3 [CD-ROM], Japan, Computer Security Group of Information Processing Society of Japan, Oct. 12, 2011, vol. 2011, pp. 797-802 (Abstract only translation).

(Continued)

*Primary Examiner* — Meng Li
(74) *Attorney, Agent, or Firm* — Patent Capital Group

(57) ABSTRACT

Code of a particular application is analyzed against a semantic model of a software development kit of a particular platform. The semantic model associates a plurality of application behaviors with respective application programming interface (API) calls of the particular platform. A set of behaviors of the particular application is identified based on the analysis of the code and a particular one of the set of behaviors is identified as an undesired behavior. The particular application can be automatically modified to remediate the undesired behavior. The particular application can
(Continued)

be assigned to one of a plurality of device modes, and access to the particular application on a user device can be based on which of the plurality of device modes is active on the user device.

20 Claims, 23 Drawing Sheets

Related U.S. Application Data continuation of application No. 14/126,866, filed as application No. PCT/US2013/065799 on Oct. 18, 2013, now abandoned.

(51) Int. Cl.
　　*G06F 21/51*　　　(2013.01)
　　*G06F 21/62*　　　(2013.01)
　　*G06F 21/55*　　　(2013.01)

(52) U.S. Cl.
　　CPC .... *G06F 21/6218* (2013.01); *G06F 2221/033* (2013.01); *G06F 2221/2105* (2013.01); *G06F 2221/2111* (2013.01); *G06F 2221/2113* (2013.01); *G06F 2221/2149* (2013.01)

(58) Field of Classification Search
　　CPC ....... G06F 2221/033; G06F 2221/2149; G06F 2221/2113; G06F 2221/2111; G06F 2221/2105

See application file for complete search history.

(56) References Cited

U.S. PATENT DOCUMENTS

| | | | |
|---|---|---|---|
| 6,460,050 | B1 | 10/2002 | Pace et al. |
| 7,506,155 | B1 | 3/2009 | Stewart et al. |
| 7,536,472 | B2 | 5/2009 | O'Neal et al. |
| 7,818,800 | B1 | 10/2010 | Lemley et al. |
| 8,127,351 | B2 | 2/2012 | Takagi et al. |
| 8,407,675 | B1 | 3/2013 | Clark |
| 9,104,870 | B1 | 8/2015 | Qu et al. |
| 2004/0088588 | A1* | 5/2004 | Awada ................ G06F 21/6218 726/17 |
| 2004/0123118 | A1 | 6/2004 | Dahan et al. |
| 2004/0153329 | A1 | 8/2004 | Casati et al. |
| 2006/0190923 | A1* | 8/2006 | Jubran ................. G06F 9/44589 717/104 |
| 2008/0083031 | A1* | 4/2008 | Meijer ................. G06F 21/554 726/22 |
| 2008/0295069 | A1 | 11/2008 | Nicholls et al. |
| 2009/0085760 | A1* | 4/2009 | Lee .................... G08B 21/0213 340/669 |
| 2010/0328032 | A1* | 12/2010 | Rofougaran ............ G06F 21/36 340/5.82 |
| 2011/0230211 | A1* | 9/2011 | Kim ...................... H04W 48/08 455/456.4 |
| 2012/0166464 | A1* | 6/2012 | Honkola ........... G06F 16/90324 707/758 |
| 2012/0233695 | A1 | 9/2012 | Mahaffey et al. |
| 2013/0031595 | A1 | 1/2013 | Nevstruev et al. |
| 2013/0196621 | A1* | 8/2013 | Guday .................. H04M 15/85 455/406 |
| 2013/0212684 | A1 | 8/2013 | Li et al. |
| 2013/0226992 | A1* | 8/2013 | Bapst ..................... H04L 67/10 709/203 |
| 2013/0263206 | A1 | 10/2013 | Nefedov et al. |
| 2013/0283262 | A1 | 10/2013 | Rehtijärvi |
| 2013/0303154 | A1* | 11/2013 | Gupta ................. H04W 12/128 455/423 |
| 2014/0068755 | A1* | 3/2014 | King ....................... G06F 21/53 726/19 |
| 2014/0075514 | A1* | 3/2014 | Prasad ............... G06K 7/10366 726/4 |
| 2014/0283142 | A1* | 9/2014 | Shepherd ............ G06F 21/6245 726/30 |
| 2015/0220734 | A1* | 8/2015 | Nalluri ................ G06F 21/6218 726/23 |
| 2018/0089431 | A1 | 3/2018 | Nalluri et al. |

FOREIGN PATENT DOCUMENTS

| | | |
|---|---|---|
| CN | 101017458 A | 8/2007 |
| CN | 101444119 A | 5/2009 |
| CN | 101266550 B | 2/2011 |
| CN | 102546927 B | 3/2015 |
| JP | 2010257150 A | 11/2010 |
| WO | 2008077150 A3 | 9/2008 |

OTHER PUBLICATIONS

"Static Detection of Malicious Code in Executable Programs", Bergeron, J., et al., Int. J. on Req. Eng., Oct. 1, 2001; Retrieved from the Internet: URL: http://citeseerx.ist.psu.edu/viewdoc/dovownload. jsession=A8B7E83DBB0811435B7AE906C47AAEF1?doi=10.1.1. 102.6845&rep=rep1&type=pdf retrieved on Dec. 10, 2015].

"Unknown Virus Analysis System by Detection of Illegal Code on Memory", Kamizono, et al, Computer Security Symposium 2004 vol. Ii of II, Japan, Information Processing Society of Japan, Oct. 20, 2005, vol. 2004, pp. 427-432 (Abstract only translation).

Chinese Patent Office 2nd Office Action in Chinese Application No. 201380048869.7 dated Apr. 27, 2017, with translation 24 pgs.

Chinese Patent Office 3rd Office Action in Chinese Application No. 201380048869.7 dated Sep. 4, 2017, with translation 24 pgs.

Chinese Patent Office Fourth Office Action in Chinese Application No. 201380048869.7 dated Feb. 11, 2017, 7 pages (with English translation).

Chinese Patent Office Official Notice in Chinese Application No. 20130048869.7 dated Sep. 26, 2016 [not translated].

European Extended Search Report and Written Opinion dated May 16, 2016 in European Application No. EP13848027.2).

European Patent Office First Office Action dated Feb. 3, 2017 in European Application No. EP13848027.2, 3 pages.

Final Office Action in U.S. Appl. No. 14/126,866 dated Aug. 1, 2016.

Final Office Action in U.S. Appl. No. 14/126,866 dated Sep. 30, 2015.

Japanese Patent Office First Office Action in Japanese Patent Application No. 2015-534833 dated Apr. 19, 2016.

Non Final Office Action in U.S. Appl. No. 15/652,623 dated Apr. 27, 2018, 5 pages.

Non-Final Office Action in U.S. Appl. No. 14/126,866 dated Apr. 12, 2016.

Non-Final Office Action in U.S. Appl. No. 14/126,866 dated Jun. 9, 2015.

Notice of Allowance in U.S. Appl. No. 14/126,866 dated Apr. 18, 2017.

Notice of Allowance in U.S. Appl. No. 15/652,623 dated Aug. 13, 2018, 8 pages.

PCT International Preliminary Report on Patentability in PCT International Application Serial No. PCT/US2013/065799 dated Apr. 21, 2015.

PCT International Search Report and Written Opinion received for PCT Patent Application No. PCT/US2013/065799, dated Jan. 28, 2014.

* cited by examiner

```xml
<?xml version="1.0" encoding="UTF-8"?>
-<AppMonitor>
    -<APIsCollection>
        -<API APICategory="GetData" Name="Landroid/telephony/TelephonyManager;->
          getDeviceId()Ljava/lang/String;" ID="00001">
                <Sensitivity>4.0</Sensitivity>
                <NumberOfParameters>0</NumberOfParameters>
                <Parameters> </Parameters>
            -<ReturnType Type="Ljava/lang/String">
                <PossibleValues/>
                <PossibleSubTypes/>
             </ReturnType>
                <Description>Reads IMEI Number</Description>
        </API>
        -<API APICategory="SendData" Name="Landroid/telephony/SmsManager;->sendTextMessage
          (Ljava/lang/String;Ljava/lang/String;Ljava/lang/String;Landroid/app/PendingIntent;Landroid/
          app/PendingIntent;)V" ID="00002">
                <Sensitivity>4.0</Sensitivity>
                <NumberOfParameters>0</NumberOfParameters>
            -<Parameters>
                <Parameter>Ljava/lang/String</Parameter>
                <Parameter>Ljava/lang/String</Parameter>
                <Parameter>Ljava/lang/String</Parameter>
                <Parameter>Landroid/app/PendingIntent</Parameter>
                <Parameter>Landroid/app/PendingIntent</Parameter>
             </Parameters>
            -<ReturnType Type="V">
                <PossibleValues/>
                <PossibleSubTypes/>
             </ReturnType>
                <Description>Sends data to some cell number via sms</Description>
        </API>
        -<API APICategory="SendData" Name="Lorg/json/JSONObject;->put(Ljava/lang/String;
          Ljava/lang/Object;)Lorg/json/JSONObject" ID="00003">
                <Sensitivity>4.0</Sensitivity>
                <NumberOfParameters>0</NumberOfParameters>
            -<Parameters>
                <Parameter>Ljava/lang/String</Parameter>
                <Parameter>Ljava/lang/Object</Parameter>
             </Parameters>
            -<ReturnType Type="Lorg/json/JSONObject">
                <PossibleValues/>
                <PossibleSubTypes/>
             </ReturnType>
                <Description>Sends it to some website</Description>
        </API>
```

Annotations:
- API: READS OR SENDS DATA
- INFORMATION CRITICALITY
- DESCRIPTION OF WHAT IT DOES
- CHARACTERIZATION OF PARAMETERS: READ, WRITE, TYPE

FIG. 12A

```
.line 60
.local v0, sms:Landroid/telephony/SmsManager;
const-string v1, "54321"

const-string v3, "SUB NEWS"

move-object v4, v2 move-object v5, v2 invoke-virtual/range {v0 .. v5}, Landroid/telephony/SmsManager;->sendTextMessage(Ljava/lang/
Landroid/app/PendingIntent;)V .line 63
   return-void
end method
```

```
.line 60
.local v0, sms:Landroid/telephony/SmsManager;
const-string v1, "54321"

const-string v3, "SUB NEWS"

move-object v4, v2 move-object v5, v2

.line 63
   return-void
end method
```

FIG. 12D

```
<activity android:label="@string/app_name" android:screenOrientation="landscape" android:name=".AbcActivity">
  <intent-filter>
    <action android:name="android.intent.action.PLAY"/>
    <category android:name="android.intent.category.DEFAULT"/>
  </intent-filter>
</activity>
<meta-data android:name="com.mobclix.APPLICATION_ID" android:value="CC47B03D-BD5E-4A30-9DE4-963F6752E3F5"/>
<activity android:theme="@android:style/Theme.Translucent.NoTitleBar" android:name="com.mobclix.android.sdk.MobclixB
<activity android:name="com.airpush.android.PushAds" android:configChanges="keyboardHidden|orientation"/>
<receiver android:name="com.airpush.android.UserDetailsReceiver"/>
<receiver android:name="com.airpush.android.MessageReceiver"/>
<receiver android:name="com.airpush.android.DeliveryReceiver"/>
```

→

```
<activity android:label="@string/app_name" android:screenOrientation="landscape" android:name=".AbcActivity">
  <intent-filter>
    <action android:name="android.intent.action.PLAY"/>
    <category android:name="android.intent.category.DEFAULT"/>
  </intent-filter>
</activity>
<activity android:theme="@android:style/Theme.Translucent.NoTitleBar" android:name="com.mobclix.android.sd
<activity android:name="com.airpush.android.PushAds" android:configChanges="keyboardHidden|orientation"/>
<receiver android:name="com.airpush.android.UserDetailsReceiver"/>
<receiver android:name="com.airpush.android.MessageReceiver"/>
<receiver android:name="com.airpush.android.DeliveryReceiver"/>
```

FIG. 12E

PASSWORD STORING
TAKE PASSWORD FROM USER $p$
key = generatekey(P+ salt1)
ep = encryptwithkey( key, p)
store touple <ModeName, ep >

PASSWORD VALIDATION
TAKE PASSWORD FROM USER $p$
key = generatekey(p+ salt1)
dp = decryptwithkey(key, ep;
if ( dp equals p)
    return success;
else
    return failure;

FIG. 15A

PASSWORD VALIDATION AND DETERMINE THE MODE TO ACTIVATE
ON DEVICE LOCK SCREEN PRESENT USER UI ELEMENTS TO ENTER THE PASSWORD
TAKE PASSWORD FROM USER $p$
key = generatekey(p+ salt1)
for each mode<ModeName, ep > on device
    dp = decryptwithkey( key, ep)
    if ( dp equals p)
        return ModeName; //entered password matched with this modes password
    else
        continue;
return failure; // no modes matched the password provided

FIG. 15B

MOBILE APPLICATION MANAGEMENT

CROSS-REFERENCE TO RELATED APPLICATIONS

This application is a continuation of U.S. Ser. No. 15/652,623, filed on Jul. 18, 2017 and entitled MOBILE APPLICATION MANAGEMENT, which is a continuation of U.S. application Ser. No. 14/126,866, filed on Dec. 17, 2013 and entitled MOBILE APPLICATION MANAGEMENT, now abandoned, which is a national stage application under 35 U.S.C. § 371 of PCT International Application Serial No. PCT/US2013/065799, filed on Oct. 18, 2013 and entitled MOBILE APPLICATION MANAGEMENT, which application claims the benefit of priority to Indian Provisional Patent Application Serial No. 1215/KOL/2012 filed on Oct. 19, 2012 and entitled MOBILE APPLICATION MANAGEMENT. The disclosures of the prior applications are considered part of and are hereby incorporated by reference in their entirety in the disclosure of this application.

TECHNICAL FIELD

This disclosure relates in general to the field of computer security and, more particularly, to security of mobile devices.

BACKGROUND

The distribution and use of mobile devices, such as smart phones, PDAs, laptops, netbooks, and tablets have grown at a rapid pace. Further, adoption of such devices is also expanding and number overtaking that of desktop computers and feature phones in some developed markets. The sophistication of the operating systems and the hardware capabilities of mobile devices is also increasing and, in some cases, outpacing the features sets and functionality of traditional computers. For example, modern mobile devices can possess such varied sensors and subsystems as location sensors like global positioning systems (GPS), accelerometers, gyroscopes, near field communication (NFC), etc. that are ordinarily not included on traditional devices. Adding to this the always connected nature of some mobile devices and the tendency for their owners to constantly carry the devices, mobile devices have become attractive targets for malware developers, hackers, and other malicious actors. Further, "app stores" and other open marketplaces have enabled the development of tens of thousands of applications (or "apps") that have been developed for such devices, including device platforms such as Google Android™, iOS™, Windows™, etc., with some of these applications being of questionable quality and purpose.

BRIEF DESCRIPTION OF THE DRAWINGS

FIGS. 12A-12E represent examples of detection and remediation of undesired behaviors of an application in accordance with some embodiments;

FIGS. 15A-15B represent portions of example algorithms for managing modes in a user device in accordance with some embodiments;

Like reference numbers and designations in the various drawings indicate like elements.

DETAILED DESCRIPTION

Figure 1:
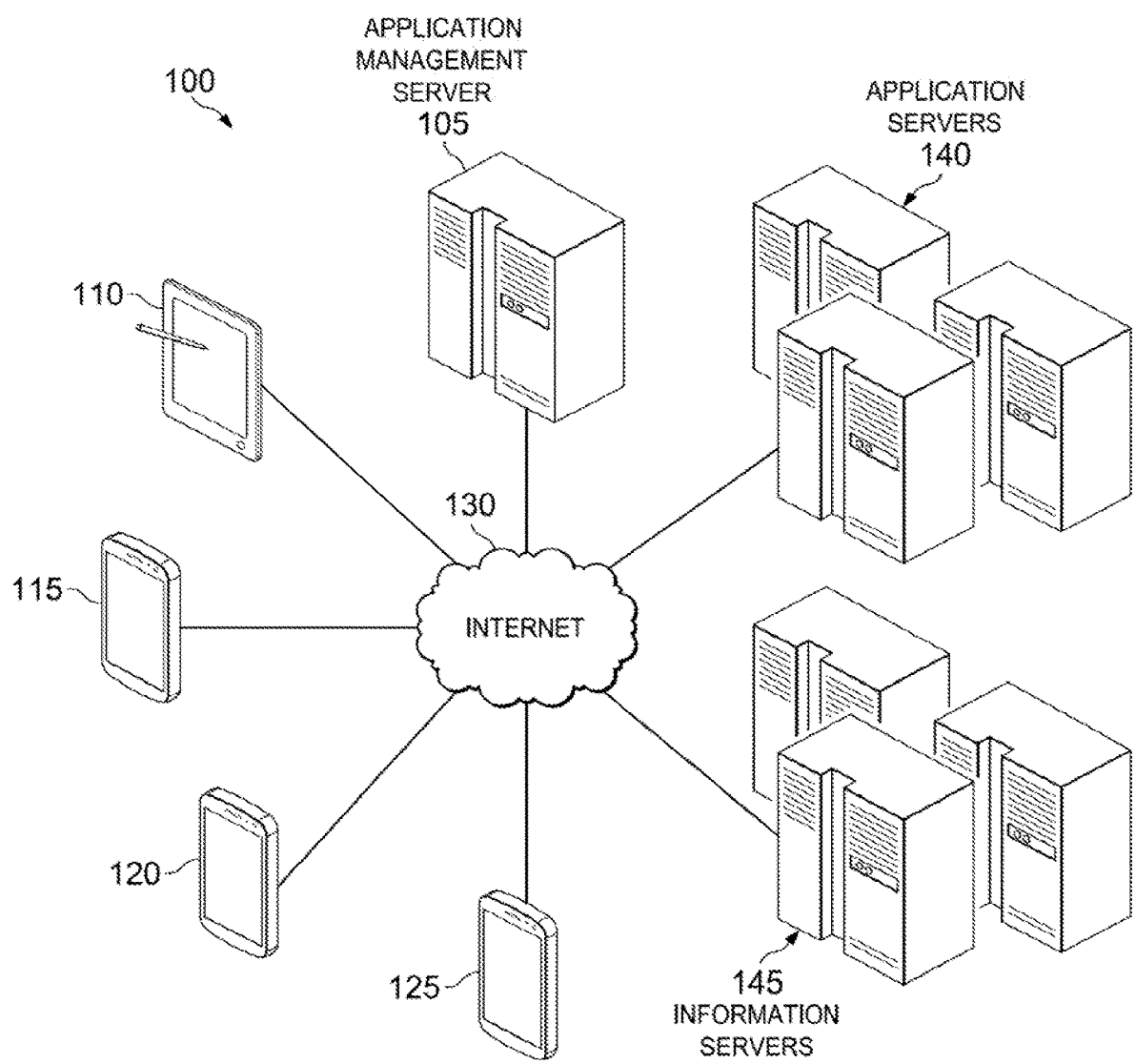
FIG. 1 is a simplified schematic diagram of an example system including an application management system in accordance with one embodiment.

FIG. 1 illustrates an example system 100 including, for instance, an example application management server 105, and one or more mobile user devices 110, 115, 120, 125, such as smart phones, mobile gaming systems, tablet computers, laptops, netbooks, among other examples. Application management server 105 can provide one or more services to the user devices to assist in the management of applications downloaded, installed, used, or otherwise provided for the user devices 110, 115, 120, 125. User devices 110, 115, 120, 125 can access application servers 140, such as centralized application storefronts, such as, for example, Android Market™, iTunes™, and other examples. Application servers 140 can further include, in some examples, other sources of software applications that can be downloaded and installed on user devices 110, 115, 120, 125. User devices 110, 115, 120, 125 can communicate with and consume the data and services of the application management server 105 over one or more networks 130, including local area networks and wide area networks such as the Internet. Among the services of an example application management server 105, applications available to user devices 110, 115, 120, 125 can be analyzed, assessed, and repaired at least in part by functionality provided through application management server 105. Further, application management server 105, in connection with services made available to user devices 110, 115, 120, 125 can interact with and consume resources, data, and services of other outside systems and servers such as information servers 145. For instance, such information servers 145 can host services and data that provide additional intelligence and context regarding applications available to user devices 110, 115, 120, 125, among other examples.

In general, "servers," "clients," "client devices," "user devices," "mobile devices," "computing devices," "network elements," "hosts," "system-type system entities," and "systems," including system devices in example computing environment 100 (e.g., 105, 110, 115, 120, 125, 140, 145, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux™, UNIX™, Microsoft Windows™, Apple OS™, Apple iOS™, Google Android™, Windows Serve™ r, etc., as well as virtual machines adapted to virtualize execution of a particular operating system, including customized and proprietary operating systems.

Further, servers, user devices, network elements, systems, and other computing devices can each include one or more processors, computer-readable memory, and one or more interfaces, among other features and hardware. Servers can include any suitable software component or module, or computing device(s) capable of hosting and/or serving software applications and services (e.g., personal safety systems, services and applications of server 105, etc.), including distributed, enterprise, or cloud-based software applications, data, and services. For instance, in some implementations, an application management server 105, application servers 140, information servers 145, or other subsystems of computing system 100 can be comprised at least in part by cloud-implemented systems configured to remotely host, serve, or otherwise manage data, software services and applications interfacing, coordinating with, dependent on, or otherwise used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 110, 115, 120, 125, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 130). Computer-assisted, or "smart," appliances can include household and industrial devices and machines that include computer processors and are controlled, monitored, assisted, supplemented, or otherwise enhance the functionality of the devices by the computer processor, other hardware, and/or one or more software programs executed by the computer processor. Computer-assisted appliances can include a wide-variety of computer-assisted machines and products including refrigerators, washing machines, automobiles, HVAC systems, industrial machinery, ovens, security systems, and so on.

Attributes of user computing devices, computer-assisted appliances, servers, and computing devices generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some system devices can further include at least one graphical display device and user interfaces, supported by computer processors of the system devices, that allow a user to view and interact with graphical user interfaces of applications and other programs provided in system, including user interfaces and graphical representations of programs interacting with applications hosted within the system devices as well as graphical user interfaces associated with application management server services and other applications, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
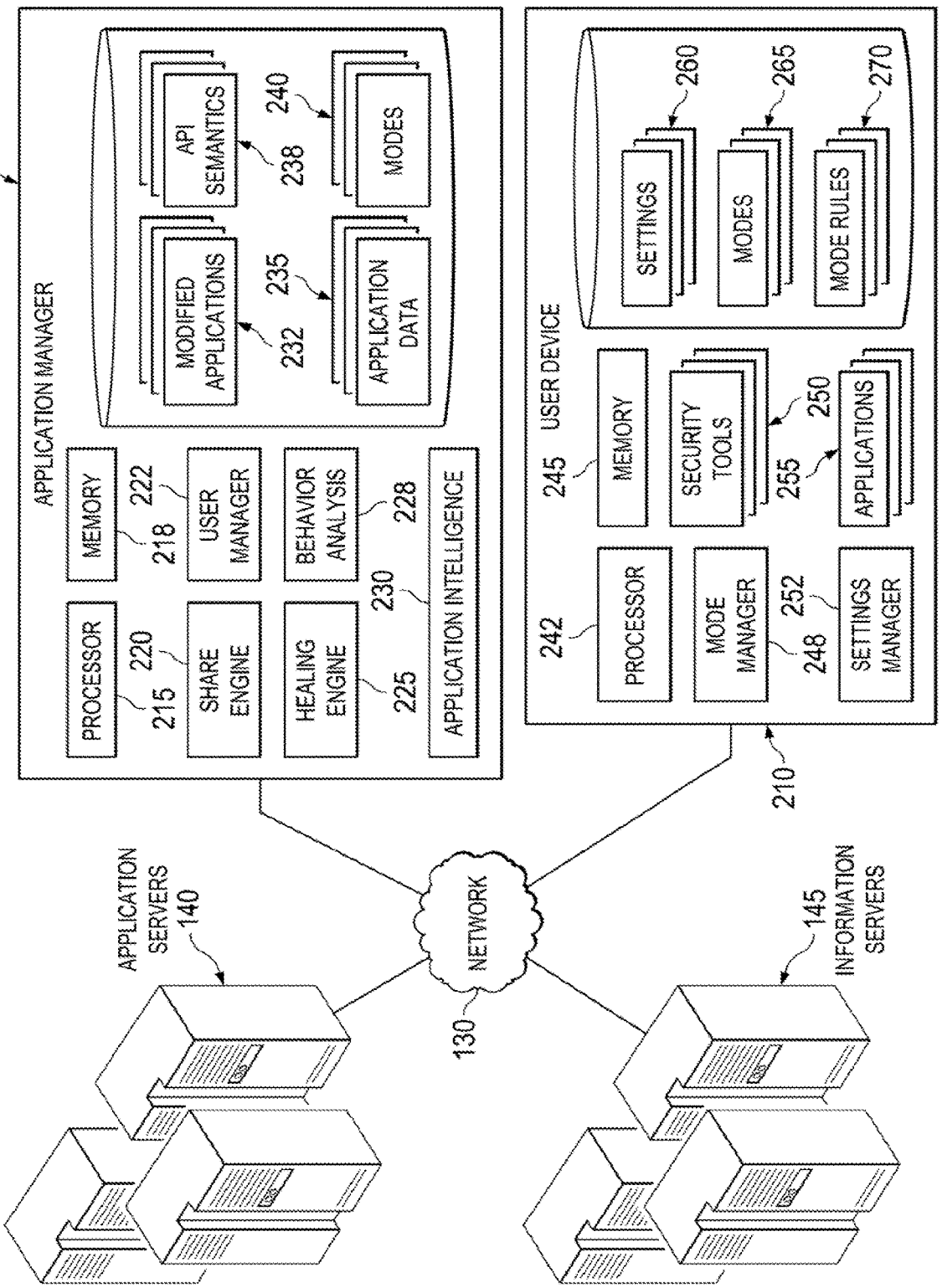
FIG. 2 is a simplified block diagram of an example system including an example application manager and user device in accordance with one embodiment.

Turning now to the example block diagram of FIG. 2, an example system is shown including an application manager 205, user system 210, among other computing devices and network elements including, for instance, application servers 140 and information servers 145 communicating over one or more networks 130. In one example implementation, application manager 205 may include one or more processor devices 215, memory elements 218, and one or more other software and/or hardware-implemented components. For instance, in one example implementation, an application manager 205 may include a share engine 220, user manager 222, healing engine 225, behavior analysis engine 228, application intelligence engine 230, among other potential machine executable logic, components and functionality including combinations of the foregoing.

In one example, a share engine 220 can be configured to provide functionality for managing crowdsourcing of information relating to applications (e.g., made available by application servers 140), as well as the sharing of such information and resources, including resources generated at least in part by or collected by application manager 205. For example, an example share engine 220 can allow modified applications 232 developed for particular users and associated user devices (e.g., 210) as well as defined application modes 240 to be shared across multiple user devices (e.g., 210), among other examples. An example user manager 222 can provide functionality for managing user accounts of various user devices (e.g., 210) that consume or otherwise make use of services of application manager 205. An example user manager 222 can associate various modified applications 232, application data and feedback data (e.g., 235), and application modes 240, including application modes developed or modified by particular users with one or more user accounts and user devices (e.g., 210) in a system, among other examples.

An application manager 205 can, in some implementations, additionally include components, engines, and modules capable of providing application management, security, and diagnostic services to one or more user devices (e.g., 210) in connection with user device attempts to download, install, activate, or otherwise use or procure various applications including applications provided through one or more application servers (e.g., 140). For instance, in one example implementation, application manager 205 can include an example behavior analysis engine 228 adapted to analyze and identify functionality of various applications made available to user devices on the system. Further, functionality of applications can be identified, for instance, by behavior analysis engine 228, that users or administrators may wish to block, limit, repair, or modify, among other examples. Accordingly, in some implementations, an example application manager 205 can include an example healing engine 225 configured to modify applications on behalf of users to eliminate undesirable application features detected, for example, by behavior analysis engine 228 and thereby generate modified applications 232. Modified applications 232 can, in some examples, be specifically modified and configured based on the requests, rules, settings, and preferences of a corresponding user. Additionally, application manager 205 may include an application intelligence engine 230 configured to collect application data (e.g., 235), for instance, from information servers 145 and other sources both internal and external application manager 205 and its client user devices (e.g., 210). An application intelligence engine 230 can be used to collect intelligence regarding one or more applications served, for instance, by application servers 144. The intelligence can be used in connection with services provided by application manager 205, such as behavior analysis and assessments of applications by application manager 205, among other examples.

In some implementations, a user device (e.g., 210) may include one or more processor devices 242 and one or more memory elements 245 as well as one or more other software- and/or hardware-implemented components including, for example, a mode manager 248, settings manager 252, security tools 250, and one or more applications 255 (e.g., procured through application servers 140). In one example implementation, a user device 210 can include a mode manager 248 that is equipped with functionality for defining, enforcing, and otherwise managing multiple application access modes 265 on the user device 210. Mode rules 270 can additionally be managed by mode manager 248, the mode rules 270 defining, for instance, particular conditions for automatically initiating or enforcing various modes 265 on the user device 210. Additionally one or more settings 260 can be defined by users, for instance, through an example settings manager 252, the setting corresponding to and in some cases used in connection with various modes 265 of the device 210, among other examples.

Figure 3:
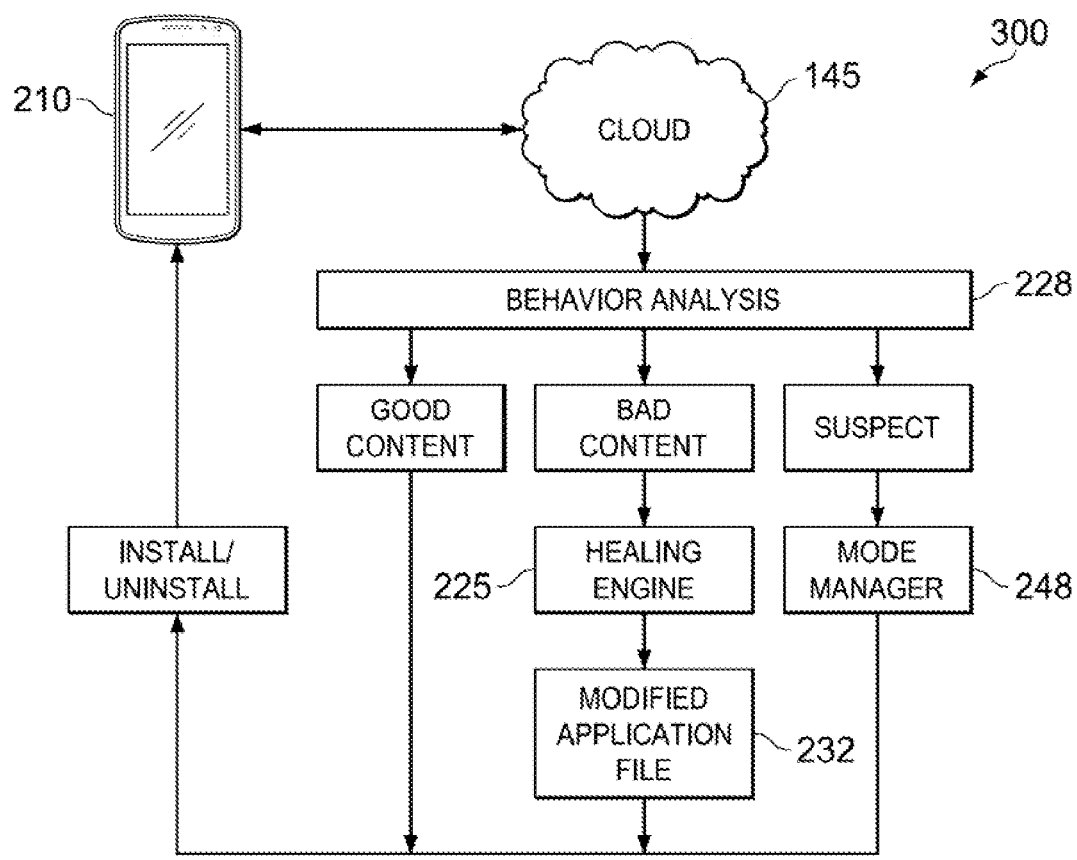
FIG. 3 is a simplified block diagram representing analysis and healing of an application for a user device in accordance with one embodiment.

Turning to the example of FIG. 3, a simplified block diagram 300 is shown illustrating functionality and flows of an example application manager. For example, a behavior monitor 228 can assess applications to identify whether one or more functions and/or content of an application are good, bad, suspect, or of unknown quality, among other examples. The assessment can be based on information acquired from a variety of sources (e.g., 145), such as information servers, user feedback, and other sources. In instances where "bad" application functionality and/or content is identified an application healing engine 225 can be engaged to modify the application and remediate the identified undesirable functionality to generate a modified application file 232 corresponding to a healed version of the application. Further, suspect or unknown applications can be designated, for instance, by a mode manager 248, to be dedicated to a particular limited access mode of the user device 210 so as to, in effect, quarantine the suspect application until more intelligence is acquired regarding the application's functionality. In instances where it is determined that an application satisfies rules, requirements, or preferences of a user, network, administrator, etc., the application may instead be allowed to proceed for installation on a user device. Further, applications which have been healed to generate a modified application file can allow for the modified application to proceed to the user device for installation on the device, among other examples.

Figure 4:
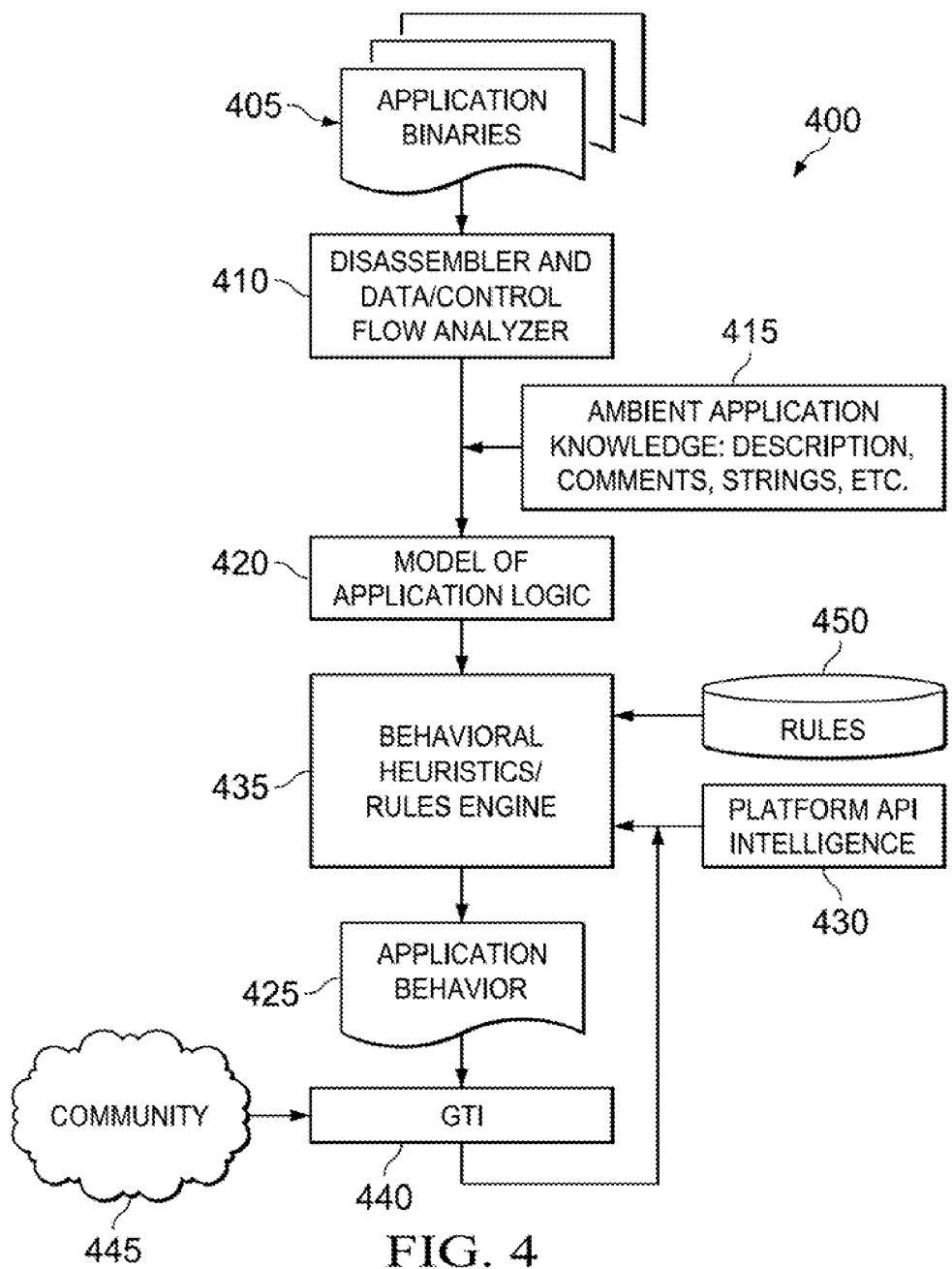
FIG. 4 is a simplified block diagram representing an example behavioral assessment of an application in accordance with one embodiment.

FIG. 4 includes a block diagram 400 illustrating example principles and activities enabled through an example application behavior analysis engine. Application binaries 405 can be accessed or received by a disassembler data/control flow analyzer 410 which, in combination with ambient application knowledge 415 (e.g., collected from outside information sources as well as users, reviewers, etc.) such as application descriptions, reviews, comments, and other structured and unstructured data, can develop a model of the application logic 420 for each application binary 405. The disassembler and control flow analyzer 410 can identify behaviors 425 of the given application based on, for example, comparing code or application logic model with known functionality defined in or identifiable from a software development kit and/or common APIs utilized by the corresponding client device operating system as well as most or all applications compatible with the client device. Some examples include the Google Android software development kit, Apple iOS software development kit, Windows software development kit, among other examples.

Generally, a platform software development kit (or "SDK") can provide documentation, header files, libraries, commands, interfaces, etc. defining and providing access to the various platform subsystems accessible by applications compatible with the platform. In one example implementation, a platform SDK and corresponding APIs and API calls (i.e., calls to functions and routines of the API) can be represented in a model that can be used, for instance, by an application behavior engine, to determine behavior and functionality of applications compatible with the platform. The semantics of commonly used APIs is represented in a program readable form along with critical information necessary to derive application behavior. The semantics of the platform SDK can be represented so that an example application behavior engine can use the semantic model to understand and identify the operations and behaviors of a given application using the API call. For example, in one example implementation, all of the potential API calls of the platform can be represented, for instance through API intelligence 430, by tagging the name of each respective API call with the behavioral tag describing what the respective API call does on the platform as well as the corresponding parameters of the API's operations and behaviors. As an example, a template of such a semantic representation can be modeled, for instance, as:

```
<APIName: name>
    <Category: read/write/process/transform/.../...>
        <CategoryDetail>
            <Reads: sensitivity>
            <Writes: sensitivity>
            <Transform: sensitivity>
    <Senitivity: red:5/orange:4/yellow:3/green:1>
    <Parameters: No of paramerer>
        <ParameterIndex:Index>
        <Type: integer/object/string/../..>
        <Operation: input/output/transformative>
        <return value: void/integer/object/string/>
    <Dependency>
        <True/False>
    <Description>
        <APIDescription: description of the API>
        <Verbs:xxx>
        <Nouns:xxx>
```

In the foregoing example, a "category" can designate the type of an API call and be used to identify the general functionality of such API calls, such as, that the API call reads information from a particular subsystem, disk, etc. generates various messages, initiates various network behaviors, attempts to communicate with various outside servers, triggers particular device functions or elements (e.g., a camera, SMS controller, etc.). "Sensitivity" can represent the respective sensitivity of the subsystem affected or associated by the API in the context of the potential for malicious behavior in connection with the subsystem, such as whether reading to a particular memory location introduces the potential for spying, where the subsystem potentially permits the introduction of malware, unauthorized tracking or data collection, the unauthorized or undesired reading or sending of SMS or email messages, among many other examples. Further, "dependency" can represent whether the output of this API can have an impact on other parts of the program in a direct way. For instance, a sendTextMessage( ) API can be identified as having no dependency where the API simply sends an SMS message out and does not return anything, among other examples.

Other information can be used by a behavior heuristics/rule engine 435 (e.g., of an example analysis engine (e.g., 228)) to determine behaviors of an application under assessment, such as global threat intelligence (GTI) 440 aggregating intelligence from a community of sources 445, rules 450, and other information.

Figure 5A:
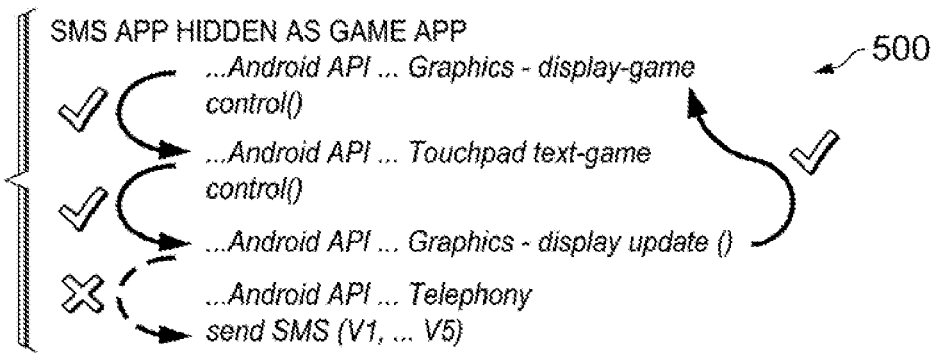
FIGS. 5A-5B are simplified representation of control flow within example applications in accordance with some embodiments.
Figure 5B:
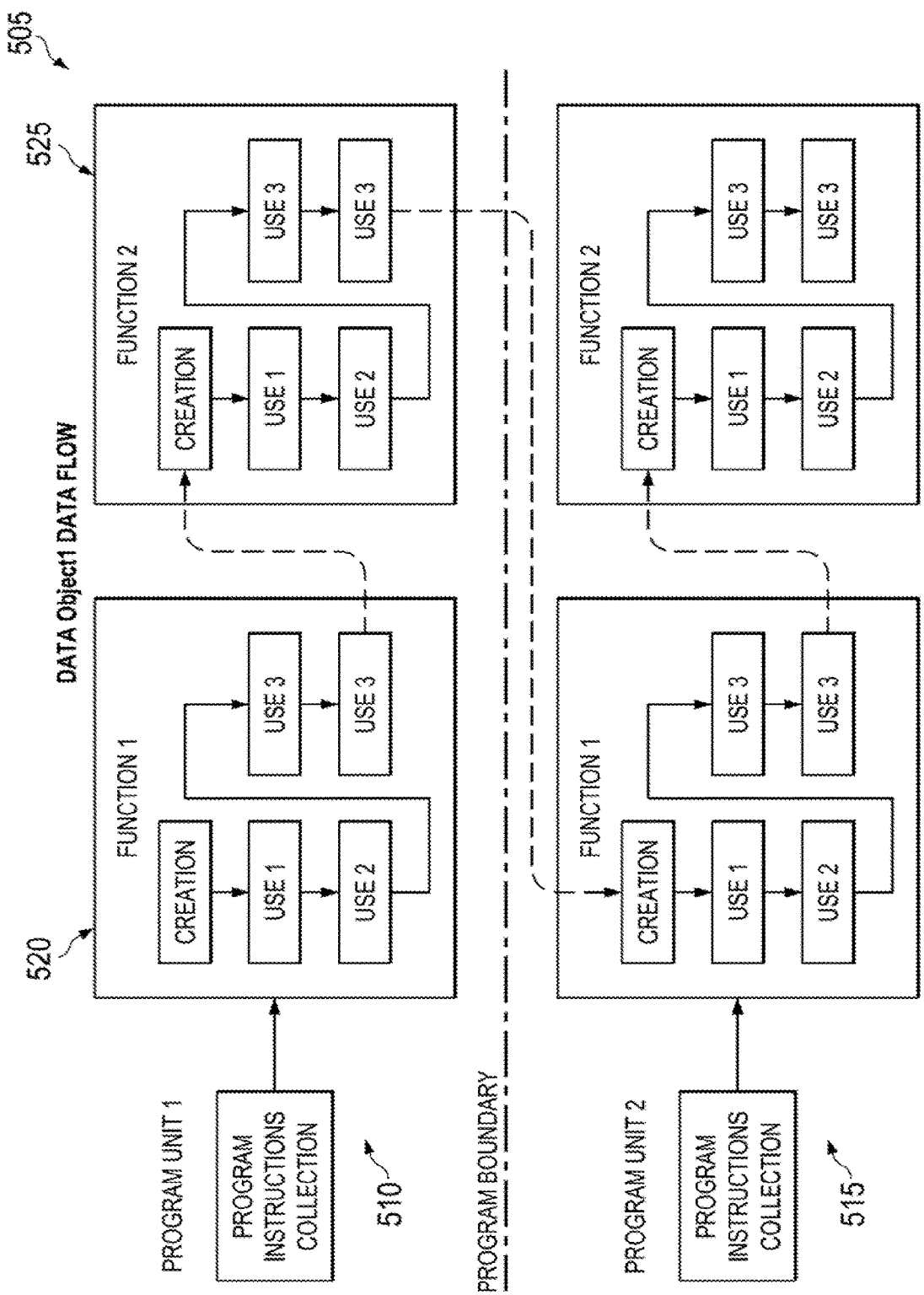

As noted above, an example application behavior analysis engine (e.g., 228) can possess functionality for identifying the control flows, operations, functionality, and behavior of a given application based, for instance, on a semantic representation of a standard platform SDK upon which compatible applications are based. In FIG. 5A, representation 500 of a simplified application control flow is shown for an example gaming application. While the functionality of the game may be in the main desirable, secure, and benign, deeper inspection of the code of the game application binary in comparison with the semantic representation of the platform SDK as well as ambient application intelligence for the game application, may yield identification of other functionality that is not immediately or otherwise identifiable, understood, or appreciated by users, such as the application sending SMS messages either with or without a user's explicit knowledge or permission. In another example, shown in FIG. 5B, inspection of a particular object of an application binary may reveal the totality of functions and control flows of the given application as well as reveal dependencies between distinct programs, program units, or applications the user may not otherwise realize, understand, or approve of. As an example, identified behavior heuristics can be represented externally, in some implementations, in an XML file that identifies the specific pattern of data flow and calls, from which the behavior can be identified. For instance:

```
<Pattern>
    < Call to API1( ): mandatory>
    < Call to API2( )/API3( )/....: mandatory>
    < Call to API5( )/API6( )/....: optional>
    < Call to API10( ): mandatory>
</Pattern>
```

In some implementations, based for instance on a model of the semantic representation of the platform SDK, application logic can be modeled and rules can be applied to interpret the application logic and identify instructions and calls within a corresponding binary of the application that correspond with malicious, privacy infringing, policy violating, or other undesirable behaviors. The logical model of an application's functionality can include representation (e.g., 505) of the application logic through data flow structures and control flow structures, among other examples. A dataflow structure can represent the lifetime of data objects as they pass-through the application logic (e.g., 510) and onto other program units (e.g., 515) including external program units. A dataflow structure (e.g., 505) can be used to identify the flow of data from one part of the application program as it moves and is potentially transformed by the application logic. For example, a dataflow model can be used to deduce that particular data is being leaked by the application through an Internet communication post operation, among other examples. Further, control flow structures can represent the control flow of different function calls (e.g., 520, 525) to identify an originating source of an application call determined to be sensitive or undesirable. As an illustrative example, a call by the application to send an SMS message can be traced back, for example, to a UI element of an application interacted with by user, or even an autonomous event in a background process of the application, among potentially many other examples.

Figure 6:
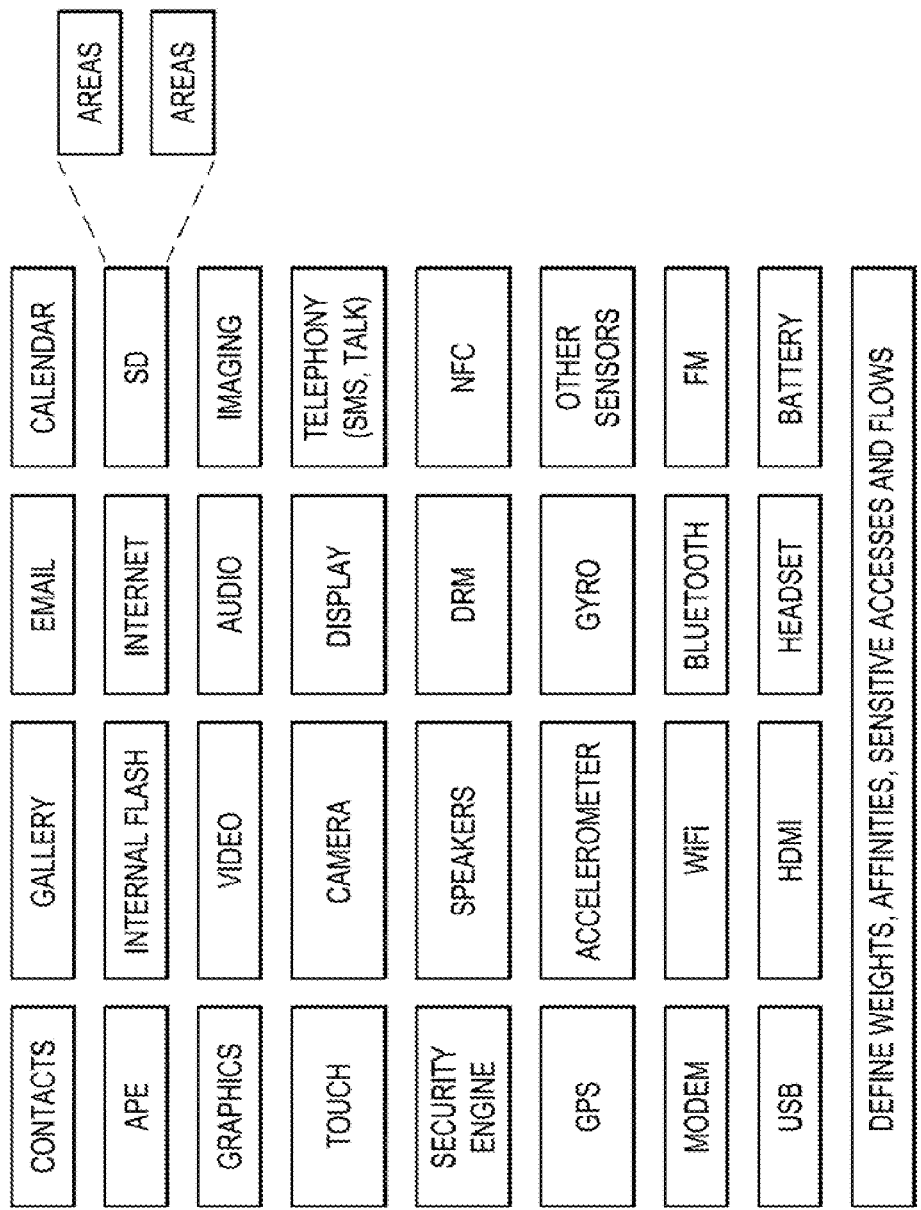
FIG. 6 is a simplified block diagram representing example subsystems accessible to an example user device in accordance with some embodiments.

Turning to the examples of FIG. 6, a simplified block diagram is illustrated representing various subsystems, devices, and functionality accessible by applications through one or more APIs defined in a platform SDK, for example. In some implementations, all platform subsystems can be categorized or assigned weights based on the sensitivity of the respective subsystem in the context of the potential that the subsystem could be manipulated or utilized in connection with a malicious or otherwise undesirable behavior. Such weights and sensitivities can be based on a variety of factors including, for example, the potential for an invasion of privacy, data leaks, financial sensitivity, among other examples. These factors can also form the basis of categorizations of the various subsystems of the platform. Such subsystems can include, for example, contact lists, photo galleries, email clients, calendars, Internet connectivity and browsing, graphics, video functionality, cameras, audio, security tools and engines, telephony, Wi-Fi capabilities, Bluetooth capabilities, data ports, battery power, touchscreens, global positioning systems, among potentially many other functionalities and subsystems including future functionality that can be integrated in mobile devices.

Figure 7:
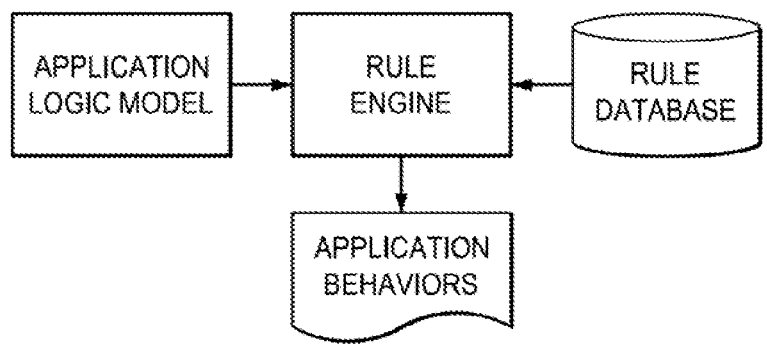
FIG. 7 is a simplified block diagram representing use of rules to determine application behaviors in accordance with some embodiments.

As represented in the example of FIG. 7, a rule engine of an application behavior analysis engine can access rules, for instance, from a rule database, including rules that have been custom defined for and/or by a particular user or set of users according, for example, to preferences of the users as well as policies applicable to the users (e.g., policies of an Internet service provider, enterprise network, broadband data provider, etc.). The rule engine can take as a further input an application logic model (e.g., developed based on a semantic representation of a platform SDK corresponding to the application) to assess the various operations and functionality of an application as identified in application logic model. The rule engine can assess the various operations and functionality of an application according to rules identified as applicable to the particular instance of an application, such as an instance of an application that has been attempted to be downloaded or installed on a particular user computing device of a user associated with the identified rules. Application behaviors can be identified by the rule engine including application behaviors identified as violating one or more rules (e.g., rules forbidding certain behaviors or actions) and prompting, in some instances, remediation of the identified application behaviors and/or assignment of the application to one or more operation modes on the destination user device, such as a quarantine or administrative operation mode, among other examples.

In some implementations, a human readable description of a behavior identified and based on a description of API semantics can be constructed. In one example, human relatable verbs and nouns can be associated with template messages in the semantic representation and mapped to particular human understandable descriptions of functions and operations available to the APIs. Further, in connection with assessments of an application according to the semantic model performed, for example, by an application behavioral analysis engine, a human-readable summary of the behavior analysis results can be generated from the mapping and presented to a user that describes the various functionality, as well as, in some implementations, the control flow dataflow of the analyzed application. Such results can make use of the human readable description to generate a description of the functionality uncovered during analysis of the application, including functionality that may otherwise be invisible to or difficult to detect by the user. For example, in one implementation, the template can be utilized and populated so as to identify and describe an example application's functionality for reading SMS data from the user's device. As an illustrative example, corresponding description could be generated such as: "This application reads your SMS data from SMS inbox and sends to a web site." Such a description could be constructed, for example, by filling in an example template based on the semantic representation of the platform SDK and APIs such as: "This application <verb: reads> your <noun:SMS data> from <noun: SMS inbox> and <verb: sends> to a <noun: website>", among other examples.

In some examples, the analyzed application behavior can reveal the use of other applications, programs, or services by the analyzed application. Some instances, a call to a local application, remote service, or other program by the analyzed application may be undesirable, for instance, when the other called application is identified as unsecure, un-trusted, or unknown, among other examples. In other instances, a program called or used by the analyzed application may be identified as a trusted program. Accordingly, in some implementations, an application behavior analysis engine can make use of, generate, modify, and otherwise manage whitelists and/or blacklists that identify the status and reputations of various programs that have been known to or could be potentially called by various analyzed applications. In some implementations, applications and services hosted by remote servers can additionally be identified in such whitelists and/or blacklists by the respective URLs or other address information corresponding to their respective host servers, among other examples.

In some implementations, the behavioral analysis engine can identify the context in which a particular activity is performed, platform API is accessed, or functionality is employed by the application under assessment. As an example, an analyzed application's attempts to access a platform telephony subsystem can be assessed based upon the cause or context of the attempt. For instance, in some contexts, a particular API call may be perfectly acceptable while in other contexts the API call can be undesirable. For instance identified application functionality that accesses the telephony subsystem in response to a user interface interaction, such as a button press, may be assessed differently than an attempt by an application to access the telephony subsystem autonomously and not in response to a user provided directive, among other examples.

As noted above, in some implementations, rules can be defined that can be used in the assessment of application behaviors. Such rules can be represented and configured for use in performing heuristic analysis of an application's logic or of a potentially malicious behavior identified by an application behavior analysis engine, including contexts in which the behavior is to be determined to be malicious. For instance, a rule engine can apply one or more rules to an application logic model to identify one a more potentially malicious or otherwise undesirable behaviors present in the application. In some implementations, a rule can be represented as:

```
<Rule>
    <Run><Dataflow><ReadOperation>of <red sub system> to a<WriteOperation> of <write sub system>
```

The rules can be generic or can be specific to a particular subsystem, etc., such as a rule to detect data leak of a memory element storing personal contact data, among other examples. A specific application behavior can be derived based on application of a single rule or multiple rules.

In some implementations, an application behavior analysis engine can be hosted on one or more server computing devices remote from the mobile user devices for which analysis performed. In other examples, at least a portion of application behavior analysis engine can be provided alternatively or redundantly with functionality of server-side application behavior analysis engine components. For instance, in one example implementation, a user computing device can be provided with application behavior analysis engine functionality allowing at least a partial or quick preliminary assessment of an application to be performed at the user device to thereby provide a user with fast feedback as well as assess whether an application should be quarantined, denied download or installation, and/or forwarded to a remote application behavior analysis engine, such as one provided in a cloud system, allowing then for a more robust behavioral analysis of the application (that could possibly introduce increased latency into the behavioral analysis assessment).

In some implementations, during an analysis of an application, downloading, insulation, or launching of the analyzed application may be prevented or delayed until the analysis is completed. In some instances, a user can be provided with a prompt identifying the analysis of the application as well as providing the user with various options for dealing with the installation, downloading, or launching of the analyzed application. For instance, a user may be provided with the option of skipping the analysis, delaying installation of the analyzed application, assigning the analyzed application to a particular mode, among other examples. Additionally, in some implementations, a prompt presented to the user in connection with the assessment may be presented together with information, such as preliminary information, gleaned from the behavioral analysis engine assessments and/or external intelligence relating to the analyzed application. Such intelligence can include, for example, intelligence gleaned by the behavioral analysis engine in previous assessments of the analyzed application, among other examples. Indeed, in some implementations, the behavioral analysis engine can indicate to the user behaviors discovered for the application, how other users have responded to feedback received from the behavioral analysis engine regarding the particular analyzed application, among other examples.

In some implementations, behavioral analysis engine can maintain blacklists, greylists, and/or whitelists of applications known to and/or previously analyzed by the behavioral analysis engine. Such blacklists, greylists, and/or whitelists can be based on historical intelligence collected from previous behavioral analyses, outside intelligence from other sources, and other users. The behavioral analysis engine can utilize such information to perform an initial assessment of an application and leverage information gleaned from previous analyses. Initial filtering or feedback can thereby be provided to a user to assist the user in determining how to deal with a particular application as well as whether to initiate further behavioral analysis on the application using the behavioral analysis engine.

Behavioral analysis of applications and/or blacklists/whitelists can further incorporate or consider general reputation information of developers or other parties identified as responsible for various applications, among other examples and considerations. Rules can be defined that consider the trustworthiness or untrustworthiness of the developer, distributor, etc. of an application. For example, an application development score rating can be computed for a developer based on aggregate analyses of applications of the developer by the behavioral analysis engine. For instance, such a rating can be derived as: AppDeveloper Rating=f(total number of apps, weighted average of undesired behavior in apps, popularity of the app, average ratio of low ratings), among other examples. For instance, in one illustrative example, a weighted average of undesired behavior can be generated for a set of applications of a developer:

| Behavior | Weight (out of 10) | No of occurrence | Total weight |
| --- | --- | --- | --- |
| Contacts leakage | 9 | 2 | 18 |
| Device ID leakage | 2 | 5 | 10 |
| Message Leakage (SMS) | 8 | 3 | 24 |
| Location leakage | 5 | 4 | 20 |
| Unnecessary permissions | 2 | 1 | 2 | and average weight can be derived by Average Weight=Total Weight/Total number of Apps, among other example implementations.

Outside sources, such as intelligence databases, such as a global threat intelligence (GTI) feed, can be used for identifying malicious behaviors that have been detected across one or more networks that may be employed by applications assessed by behavioral analysis engines. For instance, various URLs, IP addresses, phone numbers, and files can be identified that have been previously determined to be associated with or used in other malicious attacks, malware, or suspect systems. Additionally, a behavioral analysis engine can interface with intelligence databases to provide additional intelligence gleaned from the behavioral analyses of applications performed by the behavioral analysis engine itself, among other examples.

Further, in some systems and platforms, applications offered by one or more application servers or storefronts may provide users with basic descriptions, ratings, user feedback, etc. collected for a given application. Unfortunately, in many instances, such ratings, application descriptions, content ratings, etc. may be provided by, manipulated by, or otherwise influenced by the application developers themselves thereby diminishing, potentially, the truthfulness or legitimacy of the information provided to users regarding some applications. Accordingly, in some of implementations, intelligence (e.g., behavioral descriptions) gleaned from behavioral analyses of applications performed by an example behavioral analysis engine may be used to supplement, correct, or otherwise modify descriptions provided to users in connection with their browsing, purchasing, and downloading of applications available on a platform. Further, in some implementations, a behavioral analysis engine can make use of these default application descriptions, content ratings, user feedback etc. as external intelligence considered in connection with a behavioral analysis. In still other examples, a behavioral analysis engine may be used to identify common behavioral traits between multiple applications that can serve as the basis for categorizing the applications according to behavior. Such categories can then be provided to users to assist users in better understanding the qualities and behaviors, as well as potential risks, of various applications, among other examples.

Figure 8:
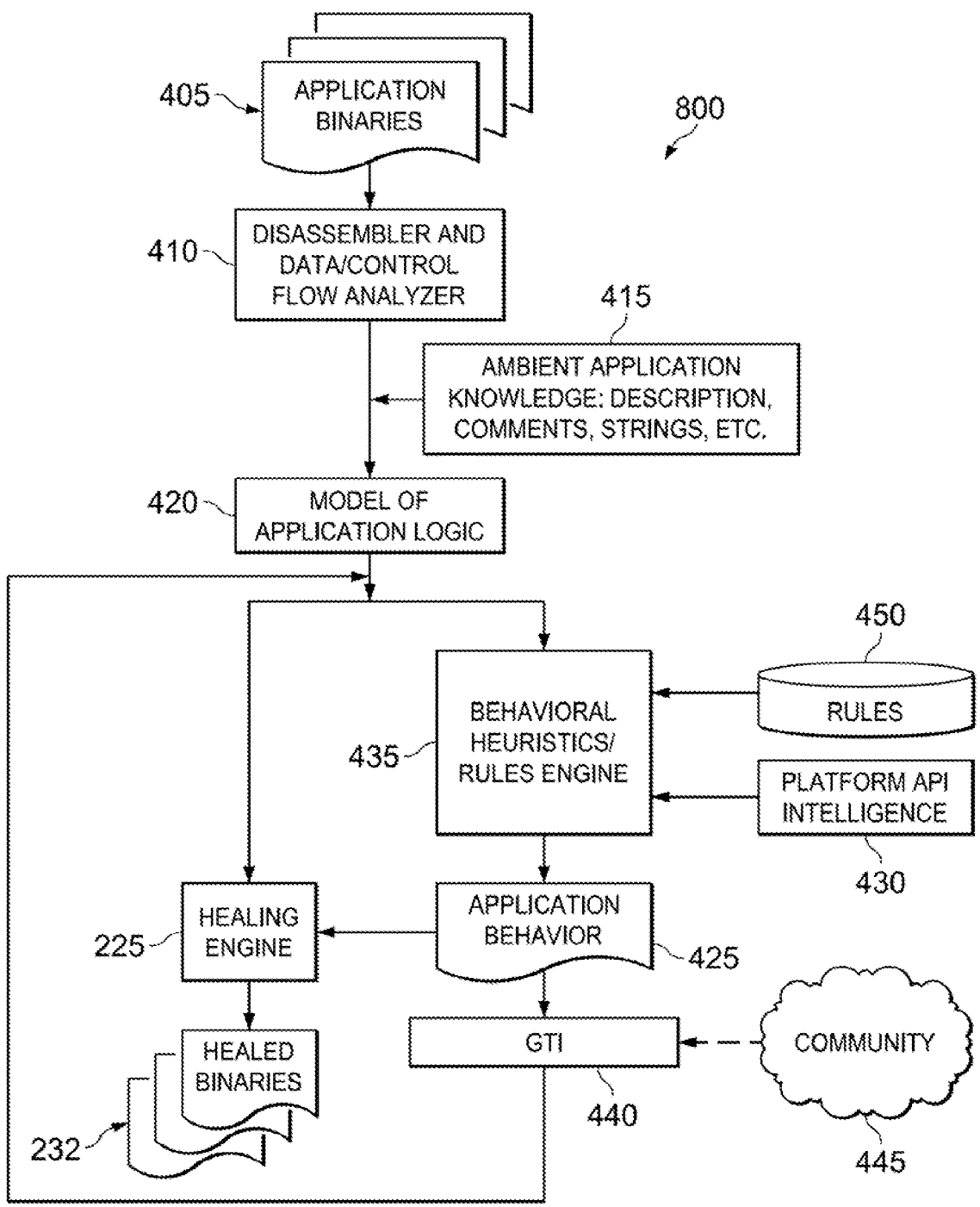
FIG. 8 is a simplified flow diagram representing assessment of application behaviors and healing of undesired behaviors in accordance with one embodiment.

Turning to FIG. 8, a simplified schematic diagram 800 is shown of an example flow for performing deep analysis of application behavior (e.g., using a behavioral analysis engine) and performing application healing in an attempt to remedy those behaviors determined to be undesirable in an application while still preserving other core functionality of the application, in some examples. As shown, application binaries can be submitted to a disassembler and data control flow analyzer 410 (e.g., of a behavior analysis engine) to develop application logic models (e.g., 420) based, in some examples, additionally on ambient application knowledge 415, intelligence, and the like. As noted above, the model of application logic 420 can be assessed based on defined rules, platform API intelligence, and behavioral heuristics through a behavioral heuristics/rules engine 435 to identify application behaviors of a respective application. Further, sections of code of the application can be identified during the assessment as responsible for the exhibited undesirable behavior. This code can be flagged for remediation. Additionally, in instances where application behaviors are identified as undesirable and are requested or dictated, by a user, administrator, or predefined rules, to be healed, the application binaries can be further processed to remove, block, or otherwise remediate the offending behaviors and corresponding code to thereby generate healed versions 232 of the application binaries that a user can then cause to be downloaded, installed, and executed on the user's device. Additionally, as noted above, the global threat intelligence feed 440 or other intelligence database can provide intelligence for consideration and behavioral analyses as well as application healing. Additionally, intelligence gleaned from the behavioral analyses can be shared with outside intelligence databases that additionally receive input, data, and intelligence from a community of users and systems 445.

Figure 9:
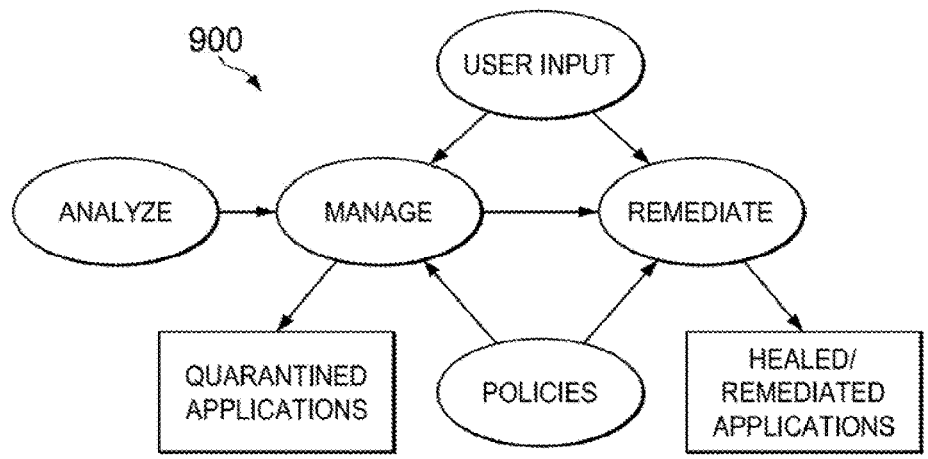
FIG. 9 is a simplified flow diagram representing decisions made in connection with the management and remediation of applications determined to include undesirable behaviors based on behavioral analyses of the applications in accordance with one embodiment.

Turning now to the example of FIG. 9, an additional flowchart 900 shown representing decisions made in connection with the management and remediation of applications determined to include undesirable behaviors based on behavioral analyses of the applications. For instance, rules and policies can be defined, for instance, by a user or system or network administrator, to define how and under what conditions applications are to be handled that have been determined to include one or more undesirable behaviors. Such policies can, for example, identify particular types of undesirable behaviors and map such behaviors to predefined courses of action, such as the healing or remediation of the applications, blacklisting or whitelisting of the applications, quarantining of the applications, among other examples. Additionally, user inputs can drive management of an application's deployment on a user computing device. Such inputs can be received in connection with prompts presented to the user and can include, for example, requests to remediate one or more identified undesirable behaviors, instructions to assign the analyzed application to a particular operation mode or quarantine area, among other examples.

Figure 10:
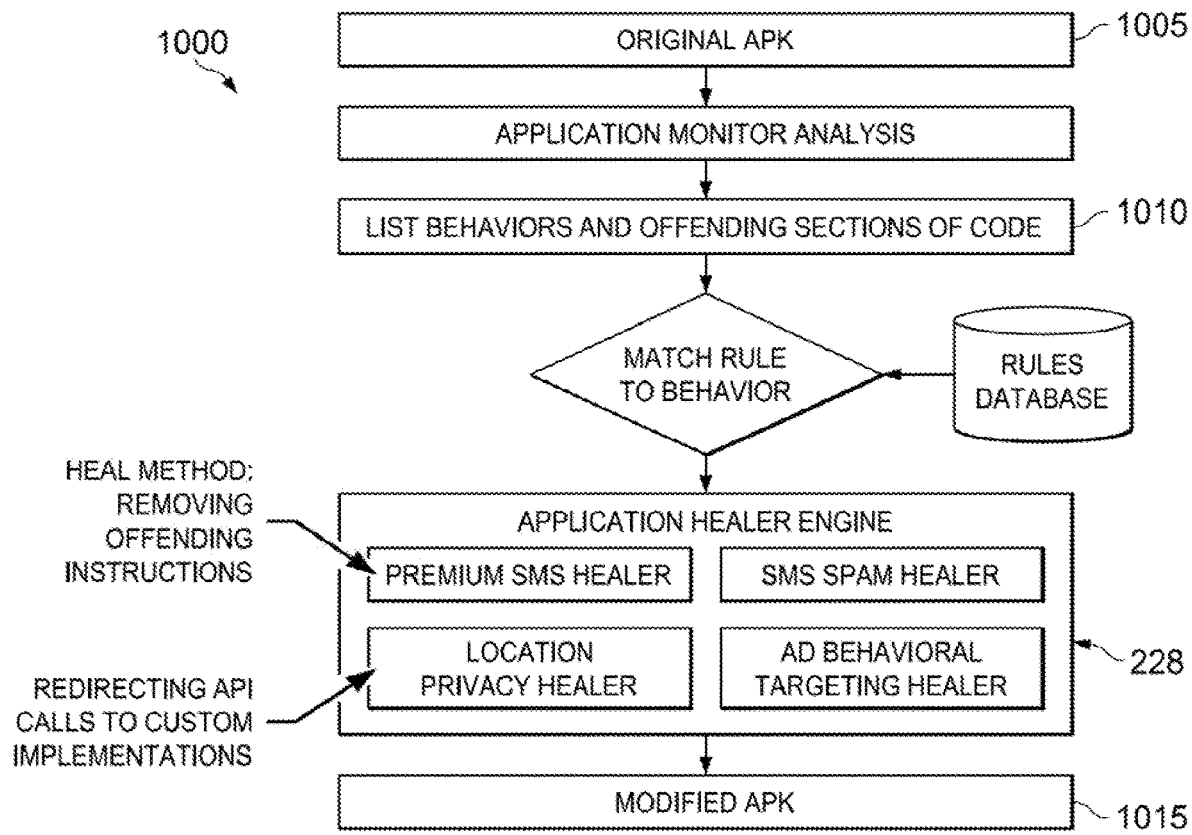
FIG. 10 is a simplified flow diagram representing an example healing of an application in accordance with one embodiment.

As noted above, static healing and personalization of application behavior can be performed by a healing engine allowing the code of the application to be modified and generate a "safe" version of the application that allows the user to retain safe or legitimate functionality of the application while removing undesirable behaviors. Such healing can in some cases be personalized or customized to particularly-defined policies driving the healing, thereby allowing a user, service provider, device manufacturer, etc. to control and personalize the functionality of applications to be installed on corresponding user devices. In FIG. 10, simplified b diagram 1000 is illustrated showing the flow of an example healing of an original application 1005. Upon identifying 1010 undesirable behaviors and offending sections of the code of the application binary, a healing engine can be provided for identifying, removing, replacing, or blocking, the offending code and corresponding behaviors in order to generate a modified application binary 1015. As an example, a healing engine 228 may include logic for modifying an application by removing or blocking various types of undesired behaviors such as, in this example, unauthorized reads or accesses of SMS functionality by removing the offending instructions discovered in the original application binary. In other instances, such as shown in this example, a healing engine may modify the offending code, such as by rewriting the code to redirect an API call to a trusted system, destination, address, etc. A healing engine 228 can modify the original code with minimal changes so as to avoid affecting the core desired functionality of the application. Further, healing policies can identify the patterns that are considered for identifying application code for healing. This can be represented, for example, in an XML file that identifies the heuristic pattern of code corresponding to an offending behavior. Each type of defined or identified pattern of code can be healed by a specific healing method, such as according to corresponding policies. Such methods can be identified and defined in such a way that the healing does not impact the rest of the application's functionality.

A variety of healing methods can be employed by an application healer engine. For instance, a particular offending line of code functionality can be identified as a final or leaf node in a control chain. In such instances, the offending code may be determined to be able to be suppressed or removed without affecting other dependencies in the application, among other examples. In another example, if a removal of a particular API call is determined to likely have no impact on surrounding code, the removal healing method can be applied. The nature and character of APIs can be learned, for example, from the semantic platform SDK representation, among other examples. In other instances, the offending behavior can be from one or more sections of code and may result in multiple methods of healing applied to remediate the behavior, such as by replacing the data in a register to alter the behavior of the API or redirecting of the API call to a new version of the API with same interface by replacing the offending API code with the new API code, among other examples. In instances where a new version of an API is introduced, the new API may, for example, do nothing and set the register status so as not to impact other parts of the program, process the inputs in a different way to avoid the undesired behavior, or do pre-processing and/or post-processing of the input/output parameter and call the original API, among other example techniques that resolve the undesirable behavior.

Figure 11:
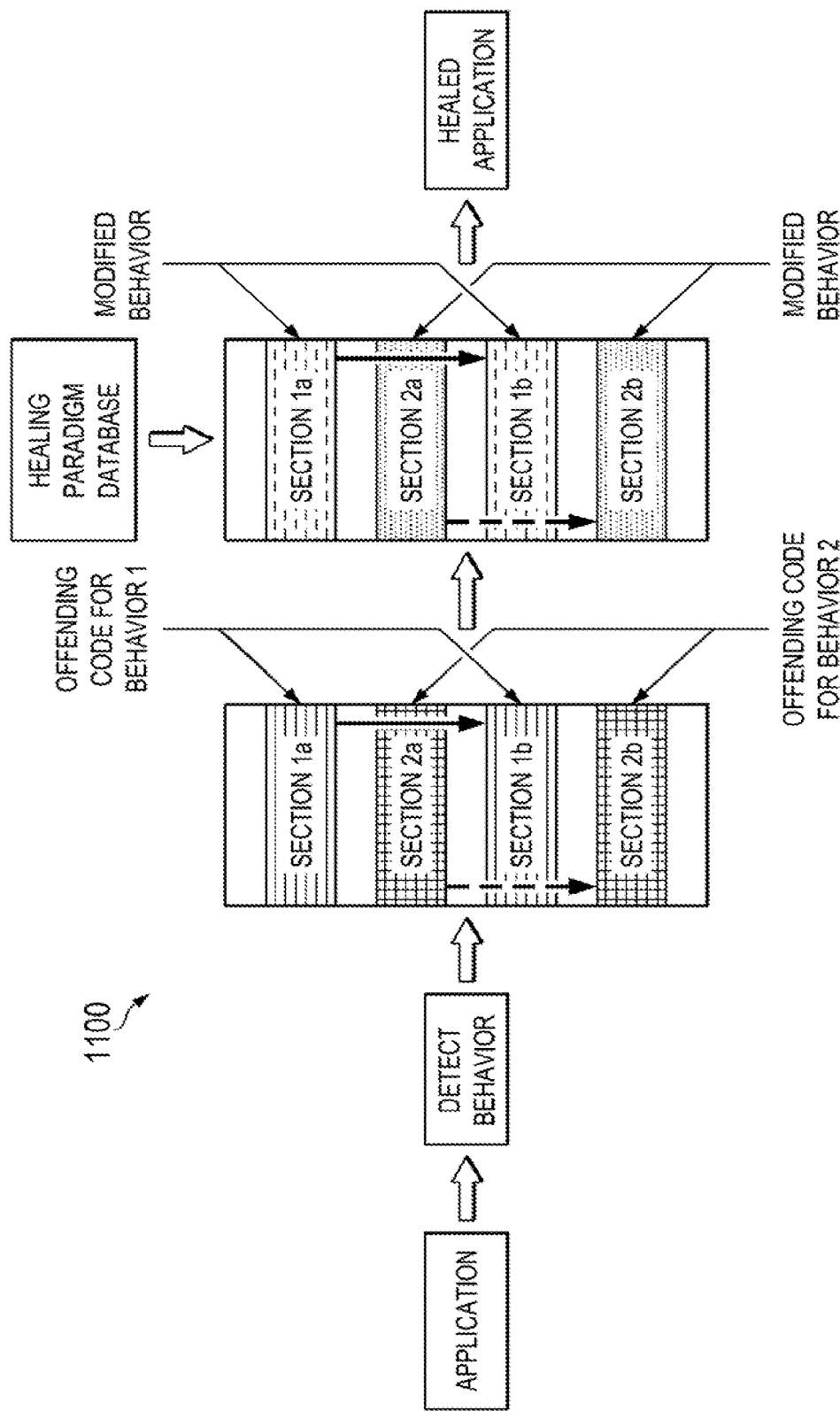
FIG. 11 is a simplified block diagram representing an example healing of an application in accordance with one embodiment.

Turning to FIG. 11, a simplified block diagram is illustrated showing the identification of code relating to particular undesirable behaviors. For instance, sections 1*a* and 1*b* of application code can be identified as corresponding to a first, detected, undesirable behavior and sections 2*a* and 2*b* can be identified as corresponding to a second undesirable behavior of the application. Accordingly, healing the application can include modifying or replacing the identified offending sections of code with code that modifies or suppresses the undesirable behaviors. Further, healing policies can be identified corresponding to the identified code or API calls to identify healing techniques for modifying the offended code and remediating the undesired behaviors.

Figure 12B:
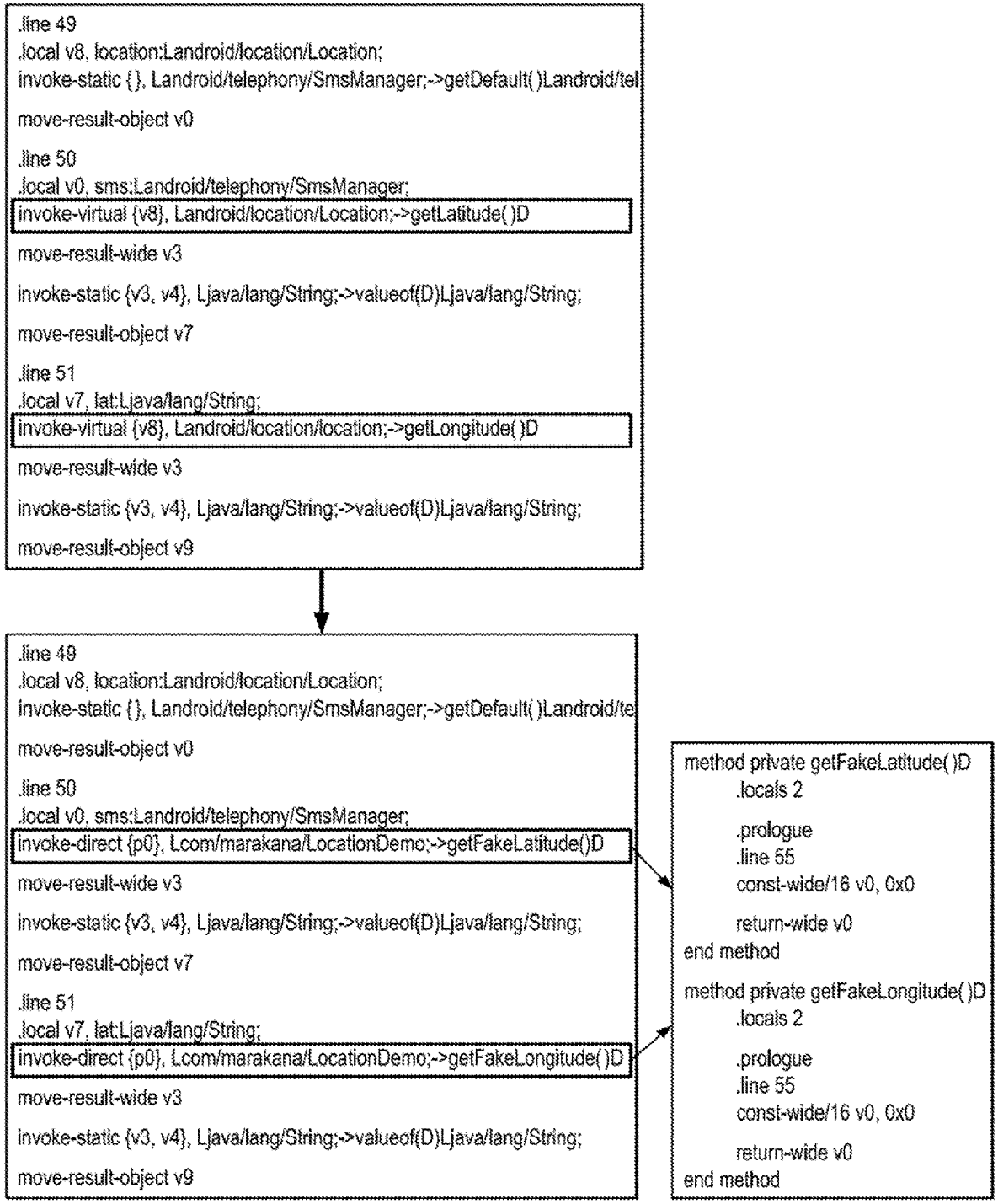
Figure 12C:
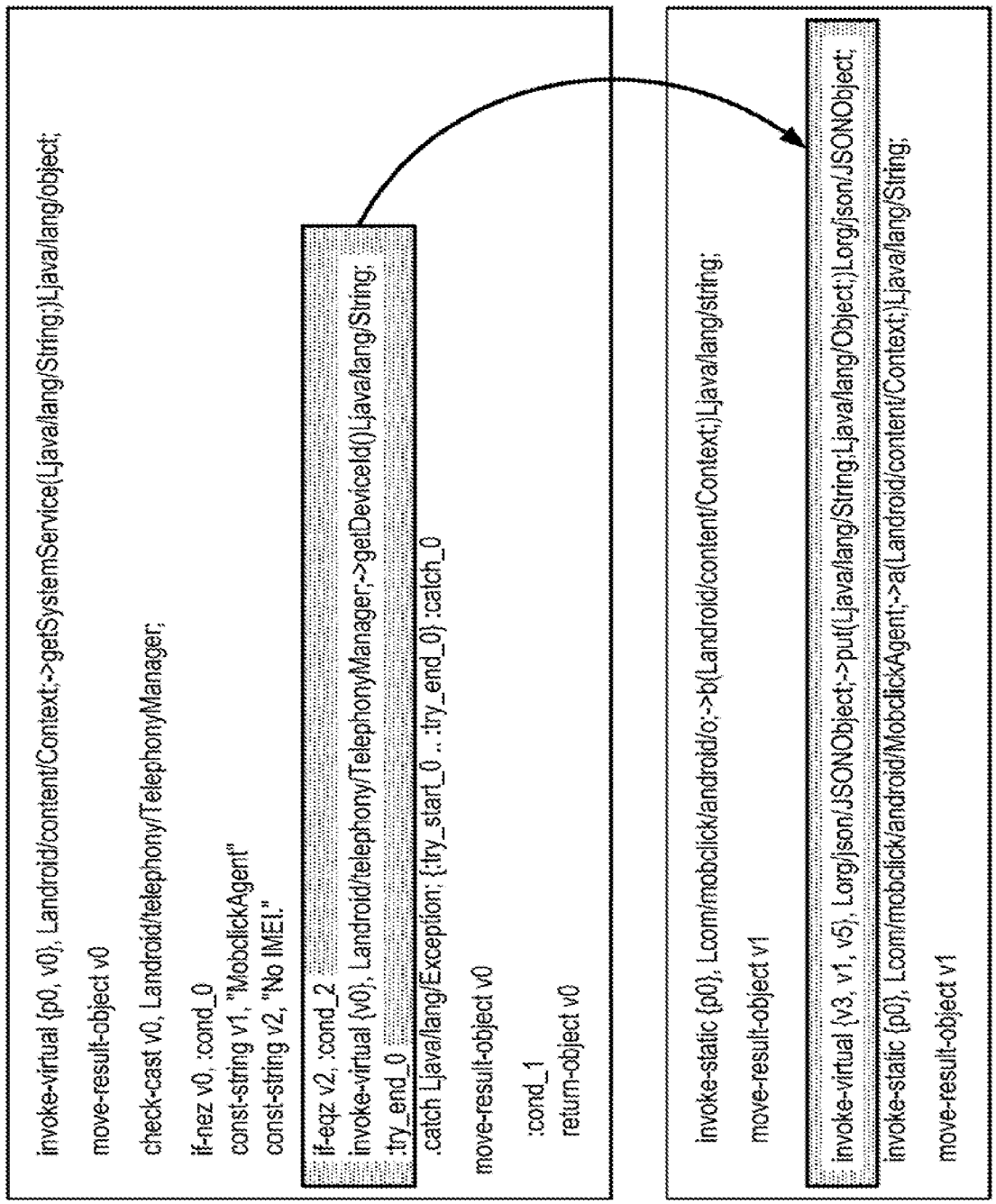

In FIGS. 12A-12E, additional examples are illustrated of the detection of undesirable behaviors as well as the remediation of the undesirable behaviors. For example, in FIG. 12A, an example code fragment allowing an application to send latitude and longitude information to an outside server is shown as having been processed to populate an API template, for instance, utilizing a behavior analysis engine. As shown in FIG. 12B, portions of the application code can be identified that correspond to the behavior of collecting geo-positional data and sending the geo-positional data to the outside server. In accordance with one example, the offending lines of code can be replaced, for example with code that masks or redirects the sending of the geo-positional data to prevent the application from tracking user location, among other examples. In another example, illustrated in FIG. 12C, a control flow can be identified within an application along with corresponding application code. As shown in the examples of FIGS. 12D-12E, remediation of a particular undesirable behavior can include deletion of an offending line of code, among other examples.

Figure 13:
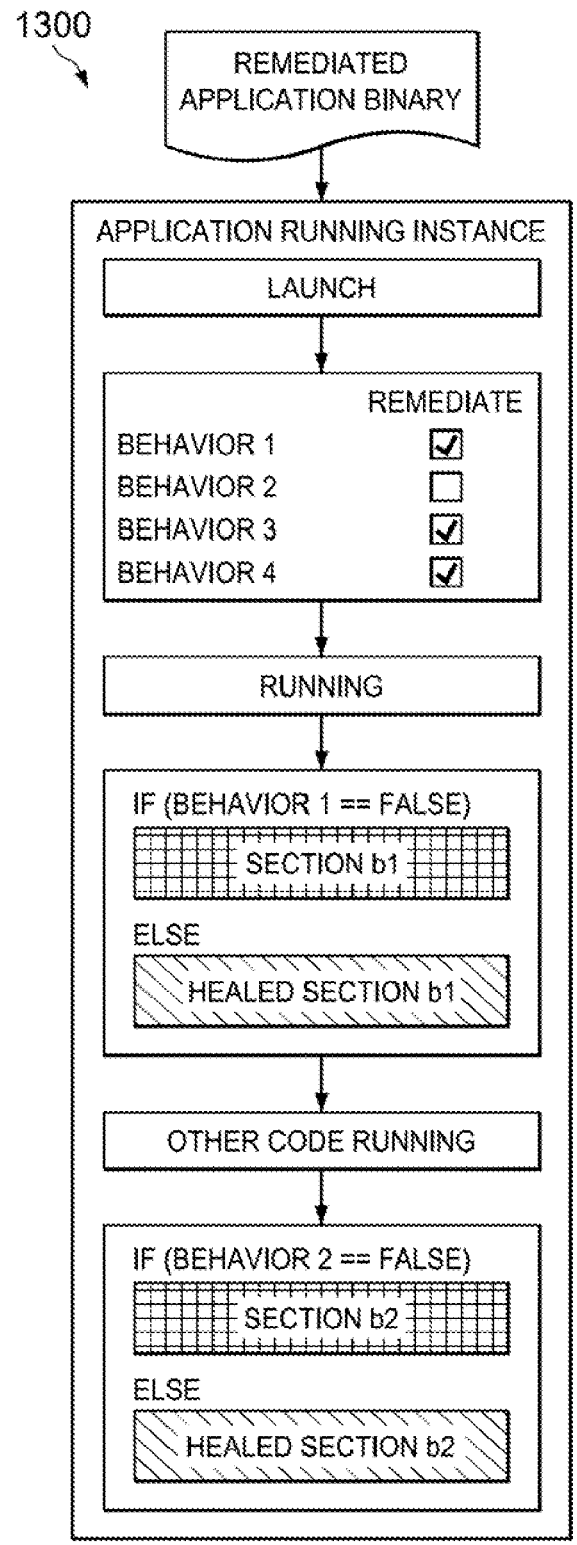
FIG. 13 is a simplified flow diagram representing an example healing of an application in accordance with one embodiment.

FIG. 13 illustrates an example flow 1300 in connection with remediation of one or more detected undesirable behaviors of an application. For instance, the connection with the dynamic personalization of an application's behavior for particular user, the composite behaviors of the application and corresponding code segments can be identified. A user interface can be presented in connection with the healing or customization of the application allowing the user to select particular identified behaviors for remediation or modifications. In one example implementation, the user interface can be provided in connection with an application healing engine with the user inputs directing how (e.g., which identified behaviors) the application healing engine is to modify the application. In another example, application healing engine can insert one or more user interface controls into the original binary of the application allowing the user at launch of the modified application to dynamically enable, disable, or otherwise remediate or customize the behavior of the application. For instance, based on the selections of the user, an original section of the code corresponding to an accepted behavior can be utilized in lieu of a healed version of the same code, among other examples. Effectively, each of the segments of the code where behavior is demonstrated can be selectively turned off or on based on the user preferences and inputs. Further, the user interface can provide a user with the option of saving the settings of an application so that the selection of a particular subset of application behaviors persists and is available the next time the application is launched on the user's device.

In some implementations, functionality can be provided to define, enable, and employ defined usage modes on the user devices. Traditionally, user devices, such as smart phones and tablet computers, among other examples, are designed to support a single user and application profile. However, a single operation profile and mode may not be appropriate for all of the actual users of the device or the situations in which the device is used. For instance, a user may desire to loan their device to a friend for some short period of time, but would like to nonetheless retain control of the access to some of the sensitive applications and data on the device, email applications, contacts, calendars, messaging functionality, etc. In other instances, the user may desire to allow a child to temporarily use the device, for example, to play game, but would prefer for other applications (e.g., web browsers) and access to certain device settings and data to be blocked from the child. Additionally, users may desire to control usage of some subset of the applications on the device to specific times, locations, and situations. For instance, games and social networking applications may be desired to be disabled during school hours, among other examples.

Figure 14A:
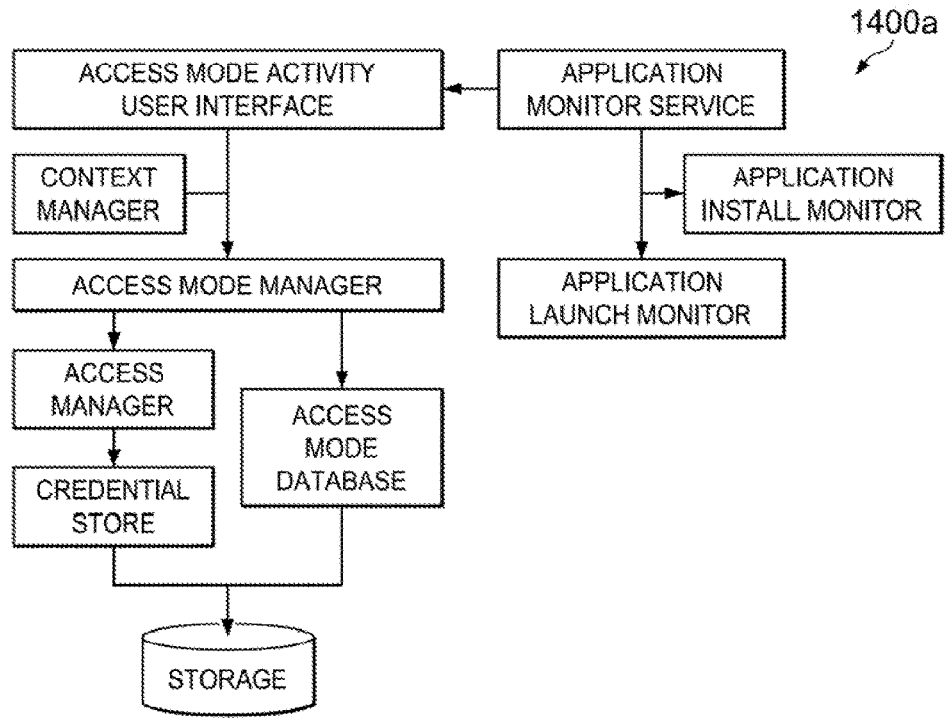
FIGS. 14A-14B are simplified block diagram representing features of an example mode manager in accordance with some embodiments.

FIG. 14A illustrates a simplified block diagram 1400a of an example implementation of a mode manager. For instance, various modes may be defined based on intelligence gleaned from the user device as well as outside services. A user may define one or more modes through a user interface and a mode manager, for instance, on the device may manage access to the various modes, for example, using dedicated credentials assigned to each of the modes. Additionally, as noted above, an application monitoring service or application behavioral analysis engine may recommend particular applications for a quarantine or high-security mode available on the user device. Accordingly, a user may define such modes to restrict access to potentially risky or currently analyzed applications to administrative, adult, or other trusted users, among other examples.

Figure 14B:
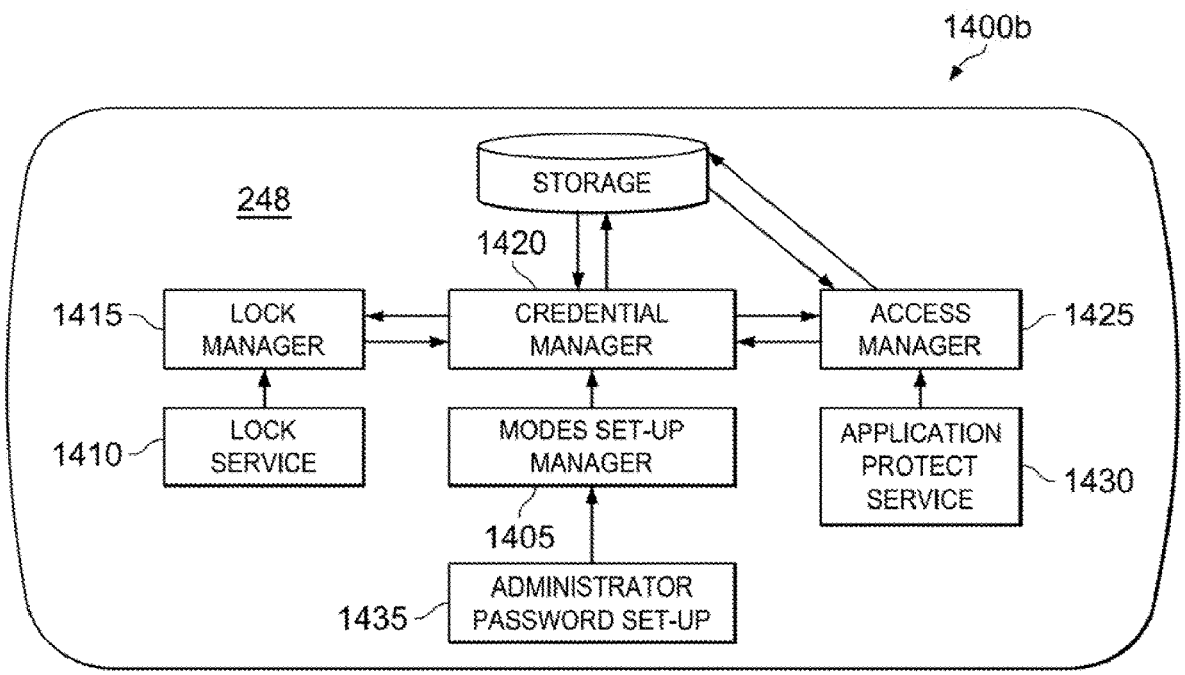

FIG. 14B illustrates another simplified block diagram 1400b Illustrating principles of an application mode manager. An application mode manager 248, in some implementations, may include various modules and functionality such as a mode setup manager 1405, lock service 1410, lock manager 1415, credential manager 1420, application access manager 1425, application protection service 1430, password engine 1435, among other examples. For instance, in the illustrated example, the user with administrative privileges can set up passwords or PINs and assign these credentials to modes defined by the user, for instance, using a mode setup manager. An access manager can utilize a credential manager to verify whether valid credentials have been received that allow a current user of the device to access one of a set of modes defined for the device. In the event that incorrect credentials are entered, a lock manager can invoke a lock service to lock out the current user from one or more applications by assigning the user to a restricted mode or locking out the user altogether.

In some implementations, a device mode can be composed of an exclusion list or inclusion list. Device modes can be defined as respective sets of applications that are either allowed or somehow protected in that mode, in the sense their usage is prohibited or limited. In some instances, an exclusion list can be defined for a mode that indicates a particular subset of the applications and/or subsystems of a device that are accessible under the corresponding mode (i.e., with the remaining applications protected or locked in that mode). For instance, a mode can be defined such as according to: <ModeName, Inclusion/Exclusion, Access PIN, App1, App2, App3 . . . App N>. In some instances, each device mode can be protected and associated with a particular password. The master mode can be defined that allows access to the entirety of the device's functionality and applications. Accordingly, a master password can be provided that enables access to the master mode. Within the master mode, the user may be provided with access to a management console for managing the set of modes available or defined at the device. Accordingly the user may edit or define modes through the management console, as well as activate or delete predefined modes. An example management console can allow a user to select, from a listing of applications, those applications the user wishes to designate as protected or accessible in any given mode. In some cases, a single application can be allowed or protected under multiple different modes.

In some implementations, mode passwords may be stored in encrypted memory. For instance, the password of each mode can be encrypted using a key generated by the same password. A stored, encrypted password can then be validated by decrypting the password with a key generated from the password entered by the user. The decrypted data can then be compared with the user-entered password. Based on the password provided by user, a corresponding mode can be identified and authenticated to allow access to the mode by the user. In some implementations, the user may manually lock the device or the device may lock itself, for instance, after a prolonged period of inactivity. When attempting to unlock the device or wake up the device a user may be again presented with a login prompt requesting a password of one of the modes available and defined for the device.

In some implementations, modes can be hierarchical. For instance, a user logged into a higher level mode (i.e., a mode providing a relatively greater level of access), may be able to freely move to another mode without providing credentials for that lower-level mode. On the other hand, a user who has been authenticated to a lower level mode may be forced to enter additional credentials when attempting to access another mode at a higher level in the hierarchy than the lower-level mode to which the user was previously authenticated. For example, in one instance, four device modes can be defined where:

Mode1 is admin level mode;
Mode 2 guest level mode;
Mode 3 is guest level mode; and
Mode 4 is low privilege mode and the hierarchy is defined as: Mode1>(Mode2 and Mode 3)>Mode 4, where Mode2 is the same level as Mode3, among other example implementations.

In some implementations, configuration of the device can be altered, customized, or at least partially restricted when certain modes are active. For example, a particular mode can activate or deactivate GPS functionality, data access, telephony, as well as certain applications. Further, in some examples, device modes can be provided that secure data of particular applications when mode. For instance, once a new mode has been created and assigned a corresponding access level to set of applications, the data of these applications may be protected by encryption through a separate encryption key. This can be implemented for example by using an encrypting file system for encrypting files and folders, among other examples.

In some implementations, the executable code of applications can be secured to protect against applications being used in modes that disallow access and/or use to one or more of the behaviors or features of the application. For instance, in one implementation, the application executable can be stored in encrypted secondary storage. An operating system loader of the user device can gain conditional unencrypted access to the executable code, in some examples, only if the application is found in an allowed application list for the active device mode in which access to the application is attempted, among other potential implementations.

In some examples, defining multiple device modes for a user device can further result in the provision of multiple unique home screens to be presented in each of the corresponding modes. As a result, in such implementations, the appearance of a given home screen can indicate to a user the mode that is active on the device as well as access privileges available in that mode. In some instances, home screens can include icons of applications that are available within that corresponding mode, hiding or obscuring the icons of other applications that are protected within that mode, among other examples.

Further, in some instances, device modes can be created automatically, for instance, based on identified behaviors and security profiles of applications that are detected or loaded on the user device. For instance, a mode manager can make use of behavioral analyses performed, for example, by an example application behavioral analysis engine, to identify applications that exhibit a common category of behaviors or category of security profiles. For instance, applications identified as permitting access to online resources may be grouped and assigned dynamically to one or more modes that have been defined as allowing such access. Other modes, such as modes dedicated for underage users, may be denied access to applications that allow users to access the Internet, among other examples. Other example categories may include applications that enable telephony or mobile messaging functionality, applications that make use of subsystems that utilize sensitive data, collect potentially private information (e.g., cameras, voice recorders, GPS systems, etc.), and other examples. In some implementations, ambient intelligence relating to an application, such as an age rating (e.g., 7+, 12+, 18+ years, etc.), user reviews, or other information may be used to categorize applications and group them in various modes. For example, a description of an application may include an age or maturity rating as well as reasons for the maturity rating. Accordingly, in one example, one or more modes may be defined, for example, that block access by child users to applications with higher maturity ratings, among other examples.

Figure 19:
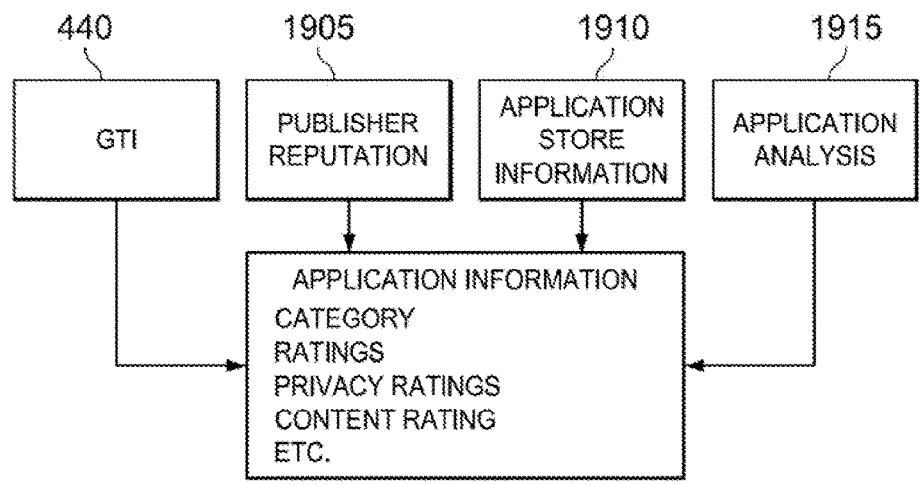
FIG. 19 is a simplified block diagram representing application information collected in accordance with some embodiments.

Other global or distributed intelligence can also be used to develop information for a given application, such as illustrated in the simplified block diagram 1900 of FIG. 19. For instance, application information can be constructed from security information regarding behaviors of an application from global threat intelligence 440, publisher/developer reputation information 1905, app store feedback and reviews 1910, behavior analysis results 1915, among other examples. Such information (e.g., 440, 1905, 1910, etc.) can be used in combination with behavioral assessments 1915 of the applications (e.g., whether an application potentially leaks data, provides location information, enables SMS messaging, etc.) to assign certain applications to particular device modes, such as quarantine or administrative modes, among other examples. A user may further designate custom categories or behaviors or select pre-defined categories or behaviors as the basis for assignments of applications to respective modes rather than individually selecting the applications for inclusion in one or more modes on al a carte basis, among other examples.

Turning to the example of FIG. 15A, an example algorithm is represented for the storing of password information associated with a particular mode. FIG. 15B represents an example algorithm for validating a password and identifying a mode to activate that corresponds to the entered password. It should be appreciated that the algorithms of FIGS. 15A-15B are non-limiting examples presented merely for purposes of illustration and that other alternative algorithms and implementations can be utilized in other instances.

Figure 16:
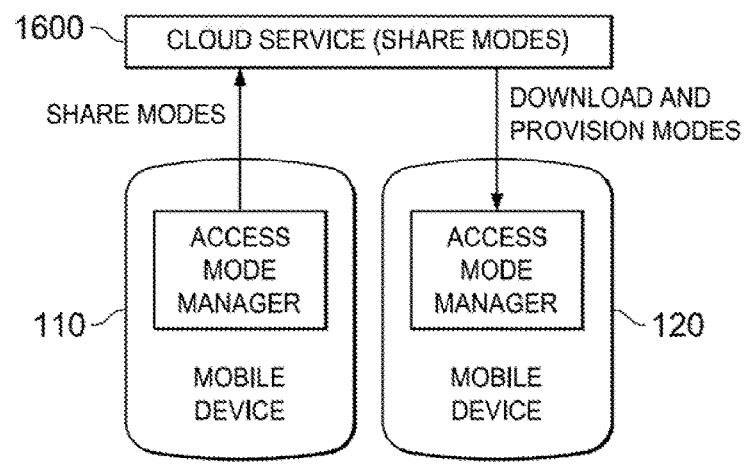
FIG. 16 is a simplified block diagram for sharing device modes between devices in accordance with one embodiment.

Turning to the example of FIG. 16, in some implementations, modes defined by a given user may be provided, for instance, to an application management service, cloud service or other service (e.g., 1600) that allows one or more modes, as well as rules associated with the modes, to be aggregated and shared with other users. Additionally, shared device modes maintained by a mode sharing service 1600 can be browsed and selected for download and utilization on user devices 110, 120, allowing a user to provision their own device with modes created by other users and shared using the mode sharing service. Further, the user can provision the shared mode, in some examples, by downloading and installing a definition of the shared mode from the mode sharing service and assigning a unique password to the newly installed mode. In still other examples, mode configurations can be shared directly between devices, with one device obtaining a new mode from another device sharing the mode, for instance, through wireless peer-to-peer technologies like Bluetooth, near field communications (NFC), WiFi, and others.

Figure 17:
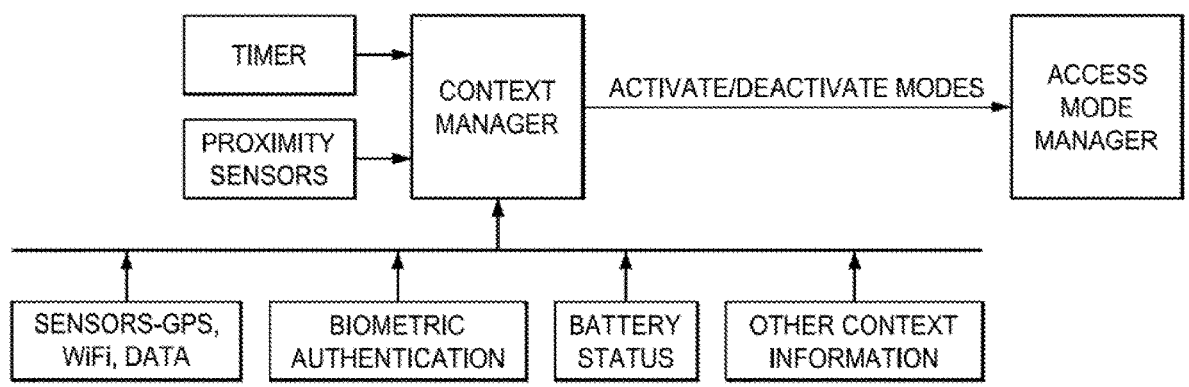
FIG. 17 is a simplified flow diagram illustrating use of context in managing modes of a device in accordance with one embodiment.

In some implementations, such as shown in the example of FIG. 17, modes can be activated automatically based on context information detected, for example, by the device itself. A user, in some examples, can configure (e.g., on the management console), rules for automatically activating particular modes. For instance, a particular mode can be activated automatically in response to the detection of a specific context at the user device. Such contexts can include, for example, detecting the location or proximity of the device within a defined geo-fence, detecting that the device is in proximity of other devices, detecting the device in range of particular data networks, detecting a user of the device (e.g., based on user biometric information collected by the device), a detected time of day, device battery status, usage activity (e.g., to guard against particular users spending too much time on the device, etc.), whether the device is traveling or in motion (e.g., as detected through GPS functionality, accelerometers, or other functionality on the device), among potentially many other examples.

Figure 18:
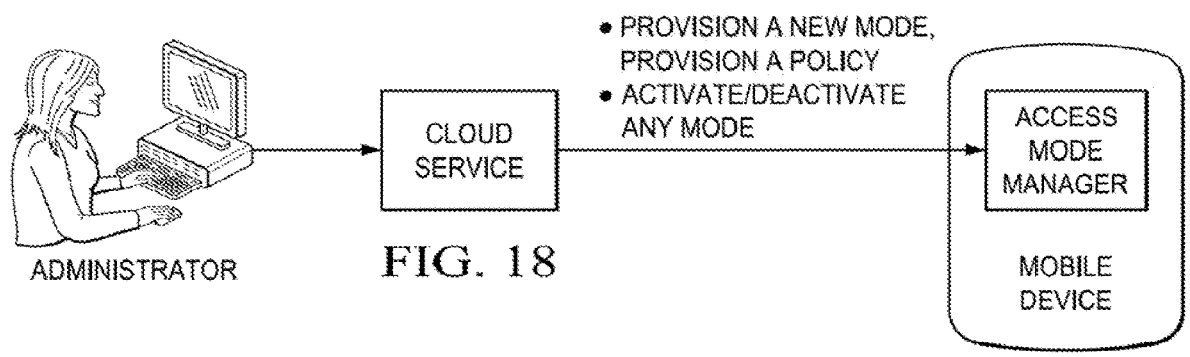
FIG. 18 is a simplified flow diagram illustrating remote provisioning and/or activation of modes on a user device in accordance with some embodiments.

Turning now to the example of FIG. 18, in some implementations, modes can be provisioned and configured through a remote service, such as a cloud service, allowing a user to activate/deactivate or define a mode remotely. Using such a service, a user can create a mode remotely (e.g., using a computer other than the target mobile user device) and provision one or more modes to the target user device and also activate and deactivate the mode on the user device from a remote location. Further, an administrator can also use the service to provision such modes on mobile user devices as well as define rules and contexts for automatically activating, applying, or deactivating a given mode, among other examples.

Figure 20B:
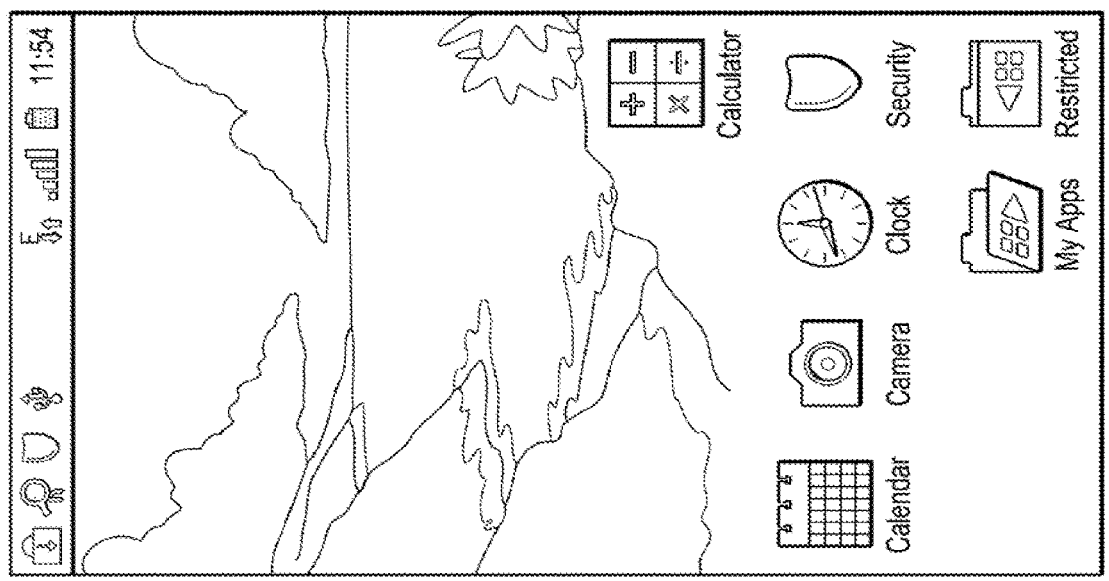
FIGS. 20A-20D are screenshots of example user interfaces provided in connection with mode management of a user device in accordance with some embodiments.
Figure 20A:
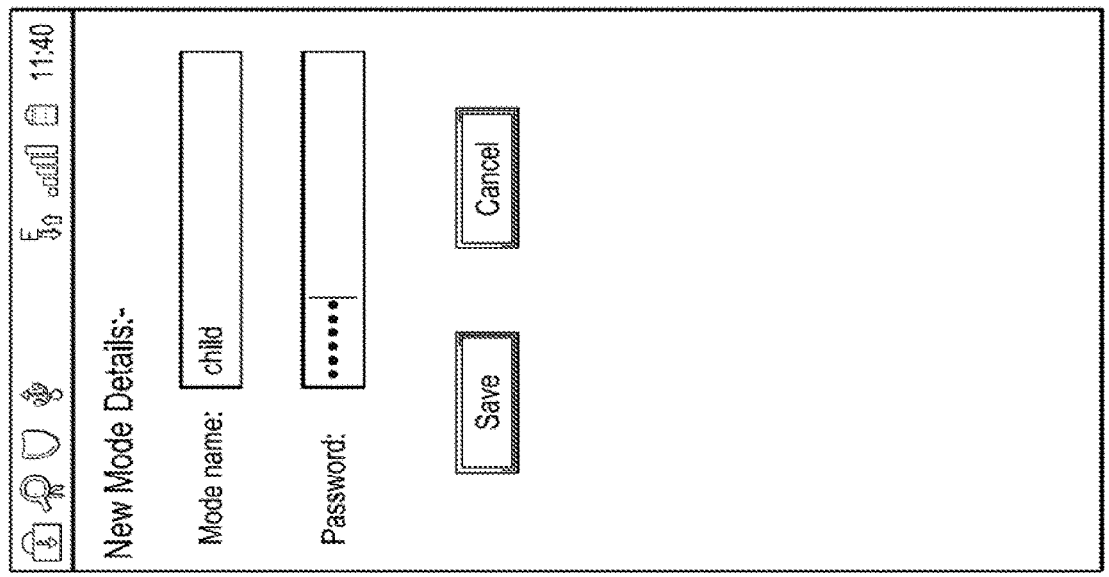

FIGS. 20A-20D illustrate example screenshots of user interfaces showing particular features of some example implementations of mode management on a mobile user device. For instance, screenshot in FIG. 20A illustrates a user interface for defining a new mode and mode password. A similar user interface can be provided to allow a user to select and activate one of multiple available modes on the device and/or provide credentials for the selected mode. In some implementations, a user device may include native login credentials or a native login manager. A mode manager may be implemented as an application itself that overrides a native login manager and replaces a native login screen with the mode-specific login prompts (e.g., that allow the multi-mode functionality of the user device). In some instances, a user may not be able to visually distinguish that a user device is provisioned with multiple modes, with the login screen capable of accepting one of a plurality of different login codes, each login code corresponding to a supported mode (including hidden modes) provisioned on the user device.

Figure 20D:
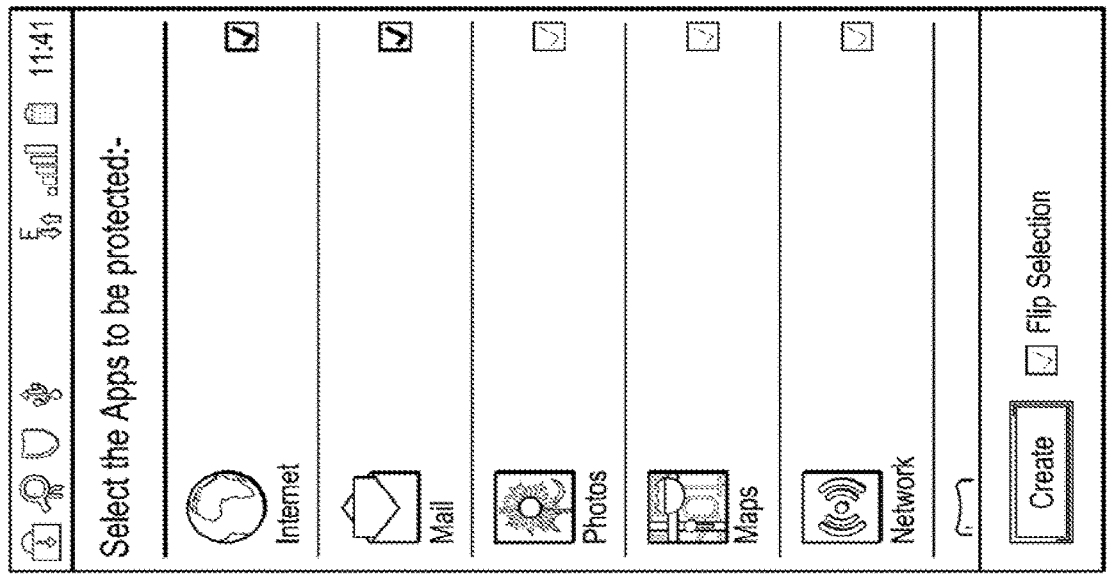
Figure 20C:
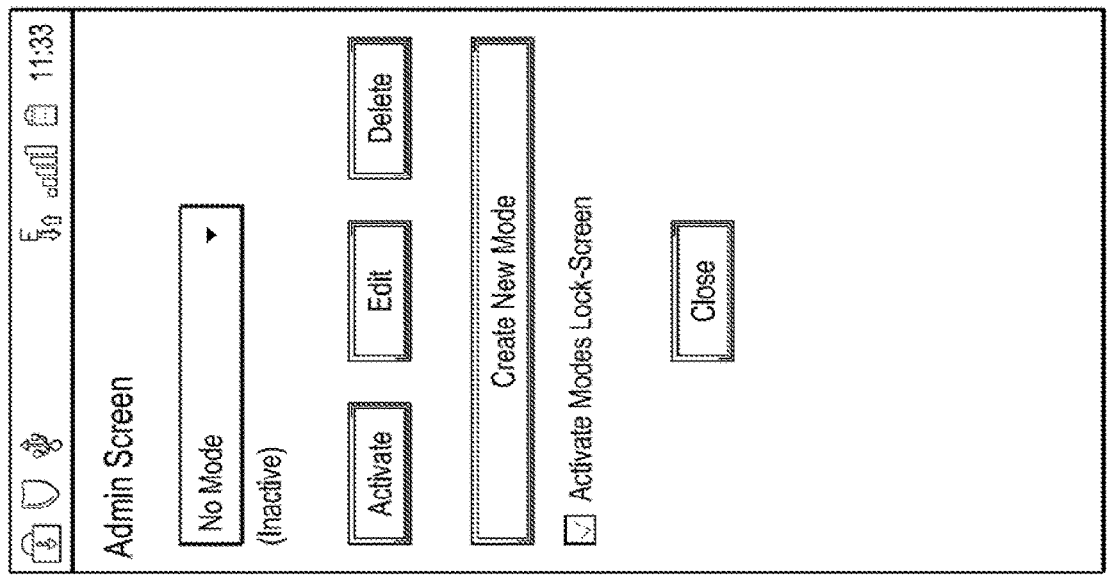

The screenshot of FIG. 20B illustrates a view of a home screen for a particular mode. As shown in this example, a set of restricted applications can be designated that can only be accessed by providing credentials to and activating a higher level mode (e.g., that permits access of the restricted applications). Further, a My Apps folder can provide access to those applications that have been enabled in a current active mode. Screenshot of FIG. 20C provides another view of an example administrative screen that permits users to activate, edit, or create new modes. Additionally, example screenshot of FIG. 20D illustrates a user interface that can be provided in some implementations of a mode manager allowing a user to designate from a list of applications on the device which applications are to be included or protected in a given mode, and so on. It should be appreciated that the foregoing examples are provided merely for the sake of illustrating certain principles and should not be interpreted as limiting examples. Indeed, a variety of different implementations, user interfaces, program architectures, operating systems, SDK platforms, and method sequences can be substituted for those examples described above without diverting from the general principles illustrated and described in this Specification.

Figure 21A:
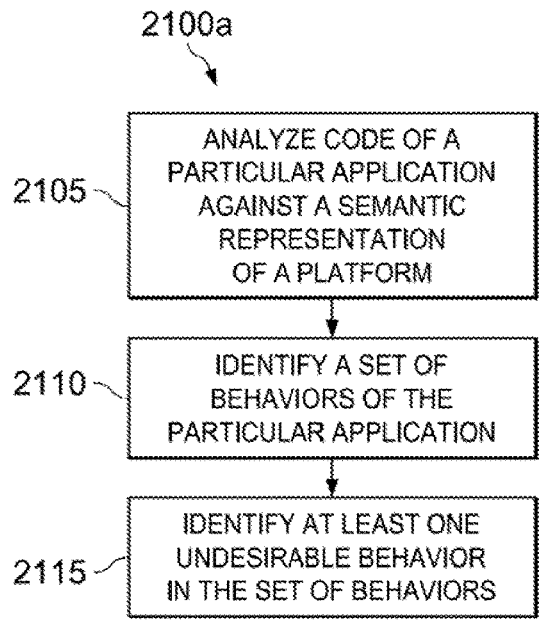
FIGS. 21A-21C are flowcharts representing example operations involving an example application management system in accordance with some embodiments.
Figure 21B:
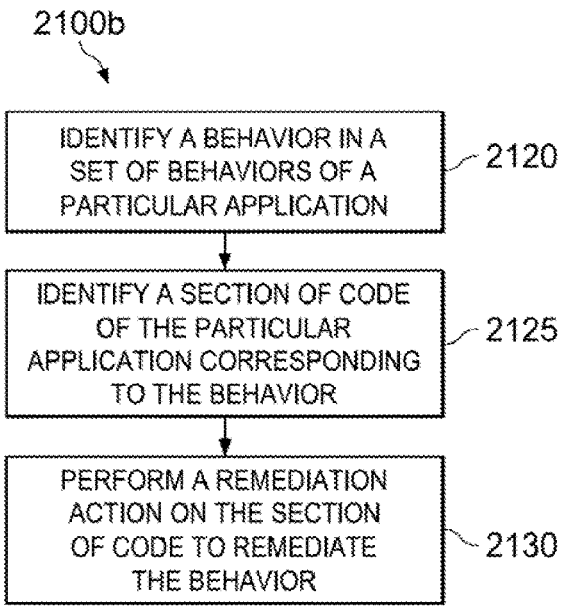
Figure 21C:
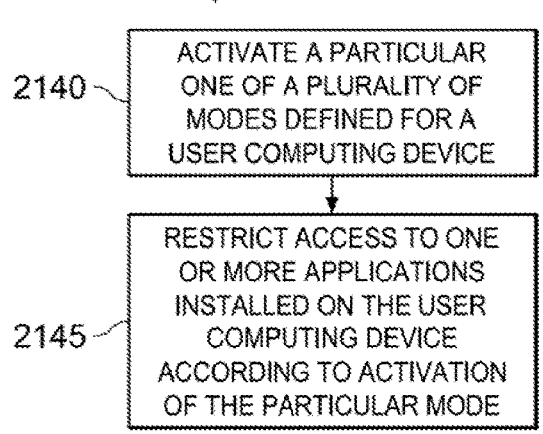

FIGS. 21A-21C are flowcharts 2100a-c illustrating example techniques in the management of applications on mobile user computing devices. For instance, in the example of FIG. 21A, code of a particular application can be analyzed 2105, for instance, against a semantic representation of a platform, such as a representation of a platform SDK and/or APIs. A set of behaviors of the particular application can be identified 2110. At least one undesirable behavior in the set of behaviors can be identified 2115, for instance, based on the user selection of one of the identified set of behaviors or automatically according to rules and/or policies defined (e.g., by a user or administrator) for applications to be downloaded, installed, launched, or otherwise used at a particular mobile computing device.

In the example of FIG. 21B, a behavior can be identified 2120 and a set of behaviors detected for a particular application (e.g., according to the principles of the example of FIG. 21A). A section of code of the particular application can then be identified 2125 corresponding to the identified behavior. A remediation action can be performed 2130 on the identified section of code to automatically remediate the behavior, for instance, in response to an identification that the identified behavior is an undesirable behavior, etc. The remediation action can result in the dynamic generation of a "healed" version of the particular application that retains at least a portion of its original functionality, with the undesired functionality being blocked or stripped from the healed version.

In the example of FIG. 21C, a particular one of a plurality of modes can be activated 2140. The modes can be defined for a particular user computing device and dictate what subset of the functionality of the computing device and its software may be accessible to a particular user having credentials for accessing a respective mode in the plurality of modes. Access can be restricted 2145 to one or more applications installed on the user computing device according to the activation 2140 of the particular mode. In addition, in some implementations, activation of the particular mode can result in a restricted or alternate configuration of the computing device to be applied that thereby limits a user's access to one or more subsystems and functionality, including hardware functionality, and settings and data of the user computing device, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. "Network elements" can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The following examples pertain to embodiments in accordance with this Specification. One or more embodiments may provide an apparatus, a system, a machine readable medium, and a method to analyze code of a particular application against a semantic model of a software development kit of a particular platform, identify, based on the analysis of the code, a set of behaviors of the particular application, and identify that one or more of the set of behaviors are undesired behaviors. The semantic model can associate potential application behaviors with one or more of APIs of the particular platform.

In one example, identifying that one or more of the set of behaviors are undesired behaviors includes determining that the one or more behaviors violate one or more rules. The rules can be associated with a particular user.

In one example, a user input identifies one or more of the set of behaviors as undesirable. The user input can be received in connection with a user interface displaying human readable descriptions of the identified set of behaviors.

In one example, code of the particular application can be disassembled into a control flow and a model of application logic for the particular application can be generated based at least in part on the semantic model. The model of application logic can be further based, at least in part, on ambient application knowledge.

In one example, a remediation action can be performed based on the identification that one or more of the set of behaviors are undesired behaviors.

In one example, the code of the particular application is analyzed in connection with an attempt to implement the particular application on a particular user device.

One or more embodiments may provide an apparatus, a system, a machine readable medium, and a method to identify a particular behavior in a set of behaviors detected as included in a particular application, identify a section of code of the particular application corresponding to the particular behavior, and perform a remediation action on the section of code to remediate the particular behavior and generate a healed version of the particular application.

In one example, the remediation action preserves other behaviors of the particular application other than the particular behavior.

In one example, the remediation action includes deleting the section of code.

In one example, the remediation action includes rewriting the section of code.

In one example, the remediation action includes adding additional code to the application to nullify the particular behavior.

In one example, the remediation action is identified from a policy identifying a remediation pattern determined to be applicable to remedying the particular behavior.

In one example, the remediation action includes inserting application logic allowing a user to selectively enable a healed version of the particular behavior at launch of the healed application on a user device. The user can be further allowed to selectively enable an unhealed version of the particular behavior in lieu of the healed version.

In one example, the set of behaviors of the particular application can be detected through an analysis of code of the particular application.

In one example, the remediation action is triggered by a user request.

One or more embodiments may provide an apparatus, a system, a machine readable medium, and a method to activate a particular one of a plurality of modes defined for a particular user device, and restrict access to one or more applications installed on the particular user device in accordance with the activated particular mode. The restricted applications can be accessible when another one of the plurality of modes is activated.

In one example, the particular mode is activated in response to a particular passcode entered by a user of the particular user device, where each of the plurality of modes is associated with a corresponding passcode. Activation of the particular mode can include identifying the particular mode from the plurality of modes based on the entry of the particular passcode, and authenticating access to the particular mode based on the entry of the particular passcode.

In one example, one or more of the plurality of modes are user-defined modes.

In one example, an alternate device configuration can be applied to the particular user device based on activation of the particular mode. The alternate device configuration can restrict access to one or more subsystems of the particular user device.

In one example, one of the plurality of modes is an administrative modes allowing for modification of the plurality of modes.

In one example, at least one of the plurality of modes is an instance of a mode downloadable from a mode sharing service remote from the particular user device.

In one example, the particular mode is activated automatically based at least in part on the detection of a particular context using functionality of the particular user device.

In one example, at least a particular one of the applications is restricted based on a defined rule for the particular mode.

In one example, the defined rule pertains to detected behavior of the particular application.

In one example, the plurality of modes includes a mode designated as a quarantine mode for application awaiting behavioral analysis or remediation.

In one example, the particular mode is activated in response to a user command received at a device remote from the particular user device.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine-readable storage medium having instructions stored thereon, the instructions when executed on at least one processor, cause the at least one processor to:
   receive a crowdsourced shared usage mode, wherein the shared usage mode is based on crowdsourced information about a plurality of devices, and shared across a plurality of devices of an enterprise;
   identify a received user input;
   cause selection of a particular mode of a plurality of modes defined for a particular user device based on the received user input, the plurality of modes including at least an unrestricted mode associated with an owner of the device and a shared usage mode associated with a non-owner of the device; and
   after selecting the shared usage mode, cause access to be restricted, at the particular user device, from one or more restricted applications installed on the particular user device, wherein the one or more restricted applications are accessible in the unrestricted mode, and wherein the restriction is based, at least in part, on the crowdsourced information.

2. The at least one non-transitory machine-readable storage medium of claim 1, wherein the particular mode is activated based on the particular user device receiving an input of a particular passcode, wherein the plurality of modes are associated with a respective passcodes.

3. The at least one non-transitory machine-readable storage medium of claim 2, wherein activation of the particular mode comprises:
   identifying the particular mode from the plurality of modes based on the input of the particular passcode; and
   authenticating access to the particular mode based on the input of the particular passcode.

4. The at least one non-transitory machine-readable storage medium of claim 1, wherein one or more of the plurality of modes are user-defined modes.

5. The at least one non-transitory machine-readable storage medium of claim 1, wherein the plurality of modes comprises an administrative mode allowing for modification of the plurality of modes.

6. The at least one non-transitory machine-readable storage medium of claim 1, wherein at least one of the plurality of modes is an instance of a mode downloadable from a mode sharing service remote from the particular user device.

7. The at least one non-transitory machine-readable storage medium of claim 1, wherein the particular mode is activated automatically based at least in part on a detection of a particular context using functionality of the particular user device.

8. The at least one non-transitory machine-readable storage medium of claim 7, wherein the particular context is detected by a sensor of the particular user device.

9. The at least one non-transitory machine-readable storage medium of claim 8, wherein the sensor comprises one or more of an accelerometer, a camera, a gyroscope, a global positioning system, a battery status sensor, and a biometric sensor.

10. The at least one non-transitory machine-readable storage medium of claim 1, wherein at least a particular application of the one or more restricted applications is restricted based on a defined rule for the particular mode.

11. The at least one non-transitory machine-readable storage medium of claim 1, wherein the particular user device comprises a plurality of applications installed on the particular user device, and wherein causing access to be restricted from the one or more restricted applications installed on the particular user device comprises the instructions, when executed on the at least one processor, cause the at least one processor to:
allow, at the particular user device, access to a first subset of the plurality of applications; and
prohibit, at the particular user device, access to a second subset of the plurality of applications, the second subset comprising the restricted applications.

12. A method comprising:
receiving crowdsourced usage information about a plurality of devices to define for an enterprise or group a plurality of modes according to the crowdsourced usage information, including at least a shared usage mode with associated usage restrictions;
identifying a user input on a user device;
causing, on the user device, selection of a particular mode of the plurality of modes based on the user input, the plurality of modes including at least an unrestricted mode associated with an owner of the device and the shared usage mode associated with a non-owner of the device; and
after selecting the shared usage mode, causing access to be restricted, at the user device, according to the associated usage restrictions of the shared usage mode, wherein one or more restricted applications accessible in the unrestricted mode.

13. The method of claim 12, further comprising applying an alternate device configuration to the user device while the particular mode is active.

14. The method of claim 13, wherein the alternate device configuration restricts access to one or more subsystems of the user device.

15. The method of claim 14, wherein the alternate device configuration is a particular one of a plurality of alternate device configurations that may be applied during activation of a respective one of the plurality of modes.

16. The method of claim 14, wherein the one or more subsystems comprise one or more of a camera, an email client, a WiFi adapter, a telephone module, a universal serial bus (USB) port, and a short messaging service (SMS) module.

17. The method of claim 12, wherein the user input is received at a device remote from the user device.

18. A system comprising:
at least one processor device;
at least one memory element; and
instructions stored on the at least one memory element to instruct the at least one processor device to:
receive from an enterprise service a plurality of modes crowdsourced from usage information about a plurality of devices, including associated usage restrictions for at least a shared usage mode selected from the plurality of modes;
identify a user input;
cause selection of a particular mode of the plurality of modes defined for the system based on the user input, the plurality of modes including at least an unrestricted mode associated with an owner of the device and the shared usage mode, associated with a non-owner of the device; and
after selecting the shared usage mode, cause access to be restricted, on the system, from one or more restricted applications installed on the system, according to the associated usage restrictions.

19. The system of claim 18, further comprising instructions to:
analyze code of a particular application of the one or more restricted applications against a semantic model of a software development kit of a particular platform, the semantic model associating a plurality of application behaviors with respective application programming interface (API) calls of the particular platform;
detect, based on the analysis of the code, a subset of the plurality of application behaviors of the particular application; and
identify that a particular application behavior of the subset is an undesired behavior.

20. The system of claim 19, wherein access to the particular application is restricted using the particular mode based at least in part on the undesired behavior.

* * * * *